US011327438B2

(12) United States Patent
Leibovici et al.

(10) Patent No.: US 11,327,438 B2
(45) Date of Patent: May 10, 2022

(54) REFRACTIVE INDEX MODULATION MODIFICATION IN A HOLOGRAPHIC GRATING

(71) Applicant: Facebook Technologies, LLC, Menlo Park, CA (US)

(72) Inventors: Matthieu Charles Raoul Leibovici, Seattle, WA (US); Austin Lane, Bellevue, WA (US); Wanli Chi, Sammamish, WA (US); Hee Yoon Lee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 245 days.

(21) Appl. No.: 16/550,046

(22) Filed: Aug. 23, 2019

(65) Prior Publication Data

US 2021/0055689 A1 Feb. 25, 2021

(51) Int. Cl.
*G03H 1/00* (2006.01)
*G03H 1/04* (2006.01)
(Continued)

(52) U.S. Cl.
CPC ............. *G03H 1/04* (2013.01); *G02B 5/0252* (2013.01); *G02B 5/0841* (2013.01);
(Continued)

(58) Field of Classification Search
CPC .............. G03H 1/04; G03H 1/0248; G03H 2001/0439; G03H 1/0252; G03H 1/0256;
(Continued)

(56) References Cited

U.S. PATENT DOCUMENTS

| 4,687,720 A | 8/1987 | Wreede et al. |
| 8,257,885 B1 | 9/2012 | Efimov |
| (Continued) | | |

FOREIGN PATENT DOCUMENTS

| WO | 2010107784 A1 | 9/2010 |
| WO | 2021040825 | 3/2021 |

OTHER PUBLICATIONS

M. Jazbinsek, I. D. Olenik, M. Zgonik, A. K. Fontecchio, G. P. Crawford, 'Characterization of holographic polymer dispersed liquid crystal transmission gratings', J. App. Phys., vol. 90, No. 8, pp. 3831-3837, Oct. 15, 2001. (Year: 2001).*
(Continued)

*Primary Examiner* — Arnel C Lavarias
(74) *Attorney, Agent, or Firm* — Weaver Austin Villeneuve & Sampson LLP

(57) ABSTRACT

Techniques disclosed herein relate to modifying refractive index modulation in a holographic optical element, such as a holographic grating. According to certain embodiments, a holographic optical element or apodized grating includes a polymer layer comprising a first region characterized by a first refractive index and a second region characterized by a second refractive index. The holographic optical element or apodized grating includes a plurality of nanoparticles dispersed in the polymer layer. The nanoparticles have a higher concentration in either the first region or the second region. In some embodiments, the nanoparticles may be configured to increase the refractive index modulation. In some embodiments, the nanoparticles may be configured to apodize the grating by decreasing the refractive index modulation proximate to sides of the grating. The refractive index may be modulated by applying a monomer reservoir buffer layer to the polymer layer, either before or after hologram fabrication.

15 Claims, 19 Drawing Sheets

(51) Int. Cl.
*G02B 5/02* (2006.01)
*G02B 5/08* (2006.01)
*G03H 1/02* (2006.01)
*G02B 27/01* (2006.01)

(52) U.S. Cl.
CPC ... *G03H 1/0248* (2013.01); *G02B 2027/0174* (2013.01); *G03H 2001/0439* (2013.01)

(58) Field of Classification Search
CPC ........... G03H 2260/12; G03H 2260/33; G02B 5/0252; G02B 5/0841; G02B 2027/0174; G02B 5/18; G02B 2005/1804; G02B 5/1866; G02B 5/20; G02B 5/203; G02B 5/32; G02B 27/01; G02B 27/0103; G02B 2027/0105; G02B 2029/0109
USPC ...... 359/1, 3, 13, 15, 32, 35, 558, 566, 569, 359/571, 576
See application file for complete search history.

(56) References Cited

U.S. PATENT DOCUMENTS

2008/0063808 A1\* 3/2008 Stumpe ............... G02F 1/13342
427/510
2008/0176146 A1\* 7/2008 Tomita ................... G03F 7/033
430/2

OTHER PUBLICATIONS

Brotherton-Ratcliffe et al., "Diffraction in volume reflection gratings with variable fringe contrast", Applied Optics, Jun. 1, 2015, pp. 5057-5064, vol. 5, No. 16.
Liu et al., "Asymmetry in the Diffraction Spectrum of a Reflection Hologram Grating", Journal of Modern Optics, Mar. 1, 2007, pp. 639-653, vol. 42, No. 3.
U.S. Appl. No. 16/505,412, filed Jul. 8, 2019.
U.S. Appl. No. 16/505,462, filed Jul. 8, 2019.
PCT Application No. PCT/US2020/032807, "International Search Report and Written Opinion", dated Aug. 3, 2020, 11 pages.
Naydenova et al., "Holographic recording in nanoparticle-doped photopolymer", SPIE—International Society for Optical Engineering Proceedings, May 20, 2006, vol. 6252, pp. 625206-625206-6.

\* cited by examiner

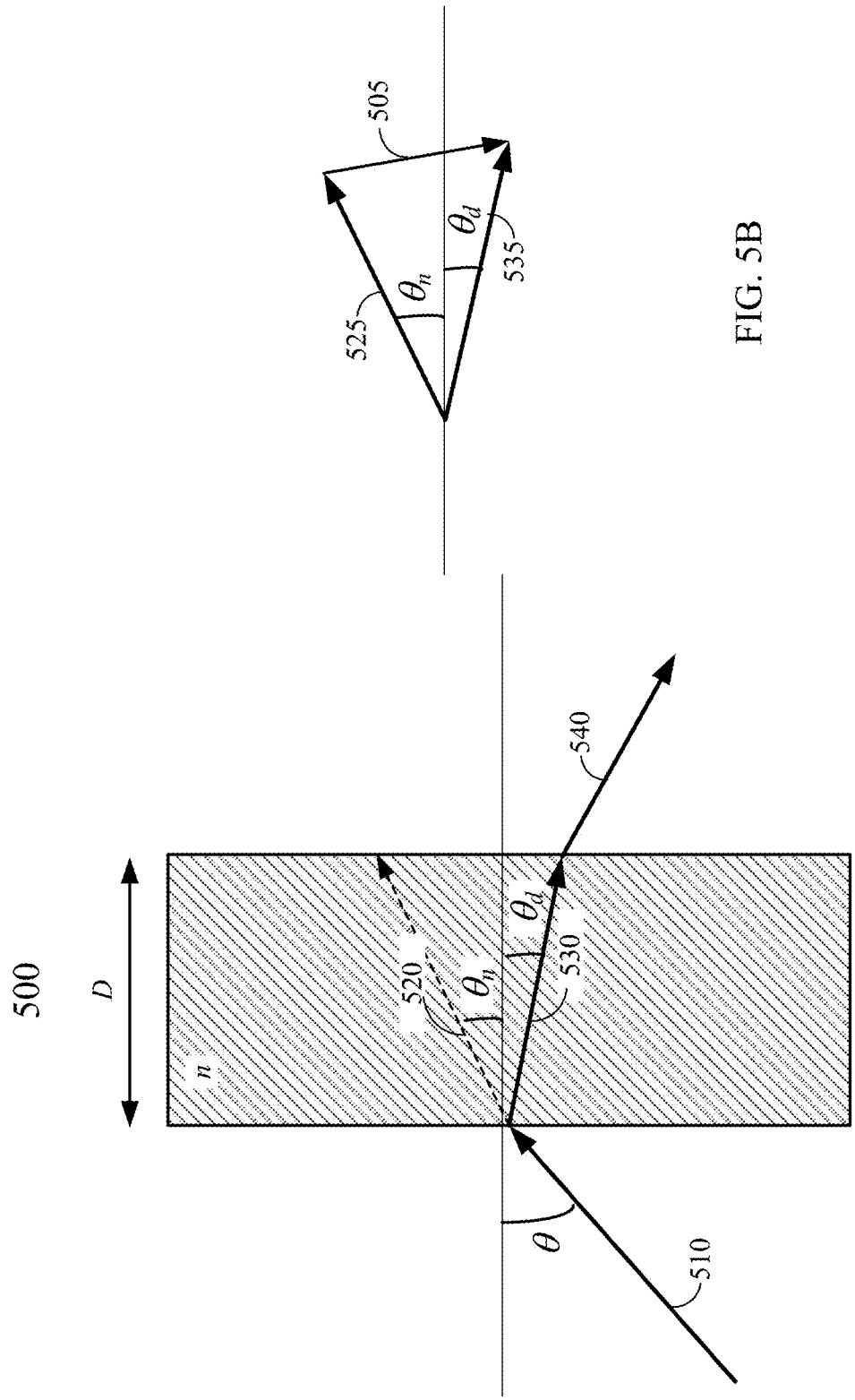

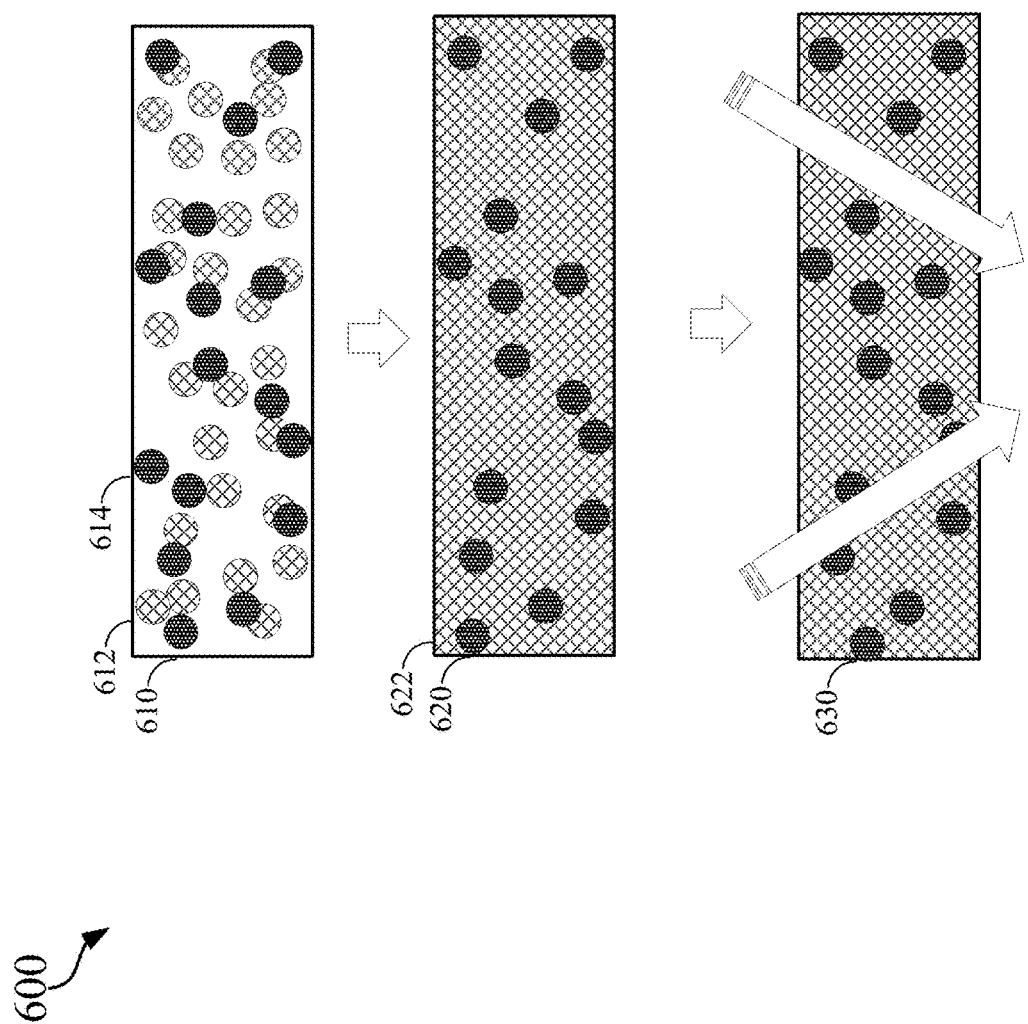

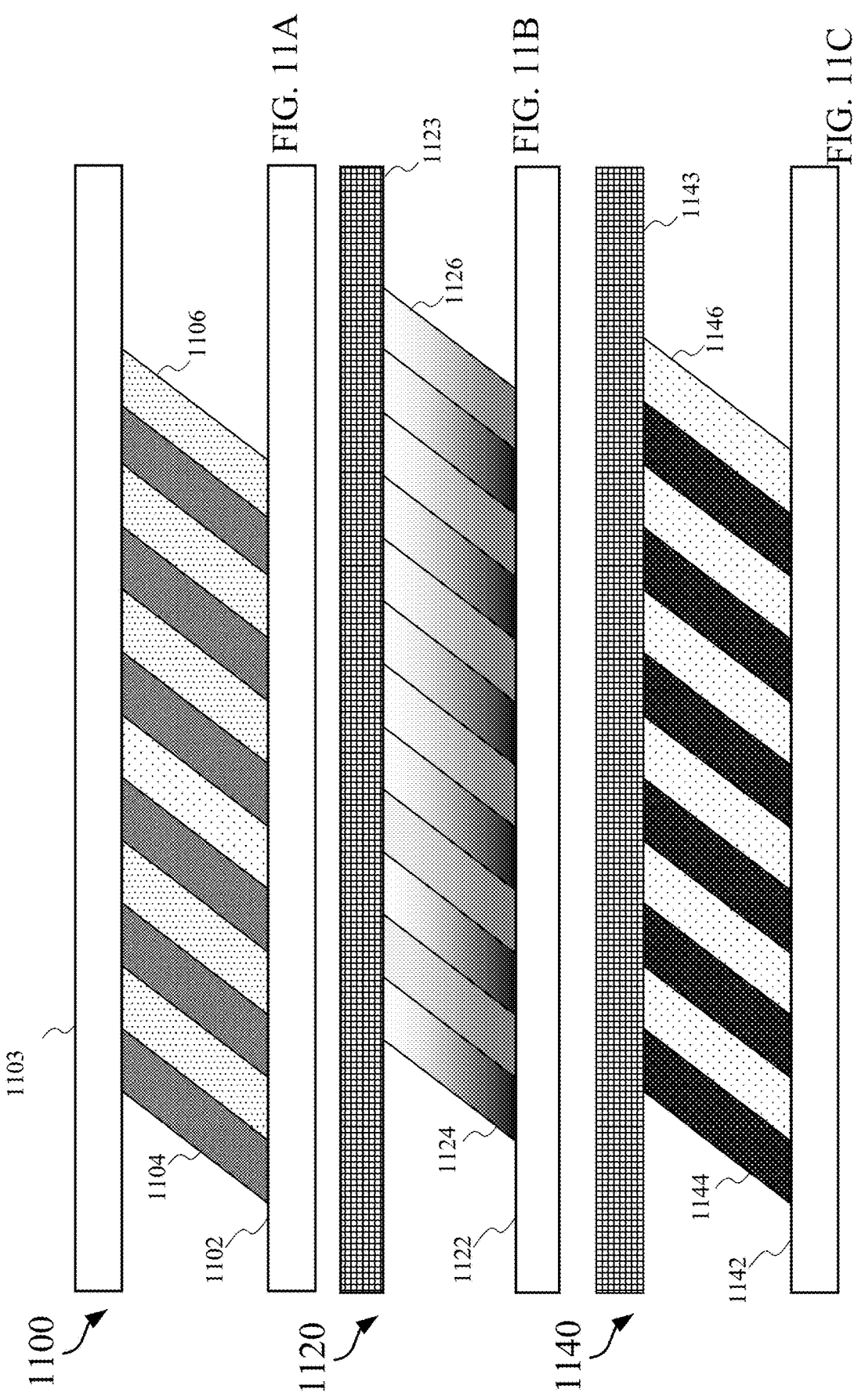

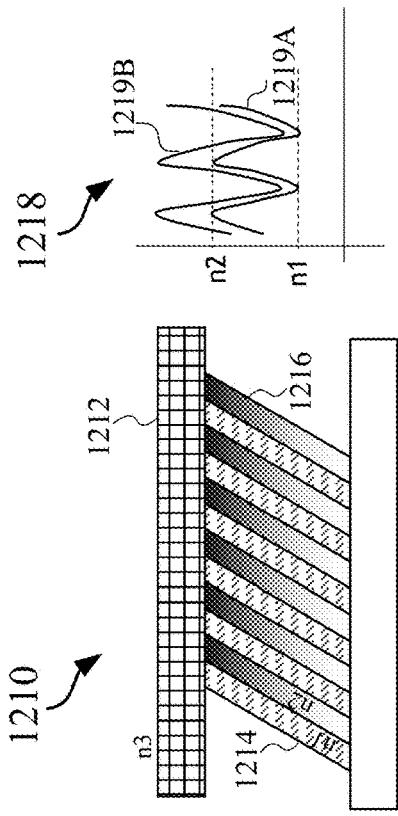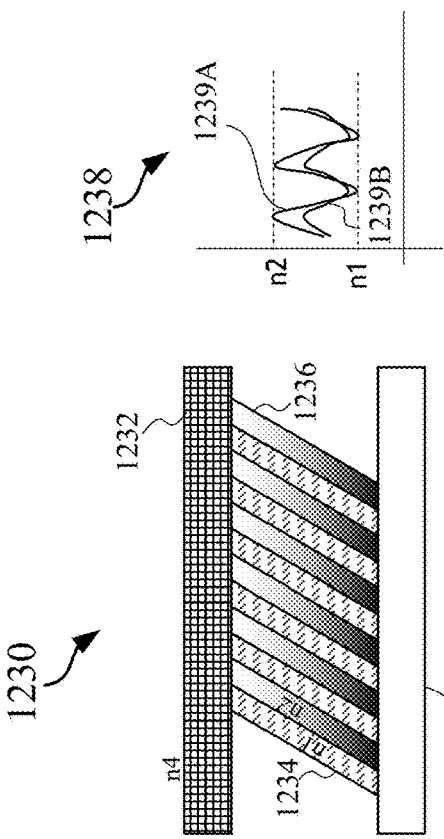
FIG. 12B
FIG. 12D
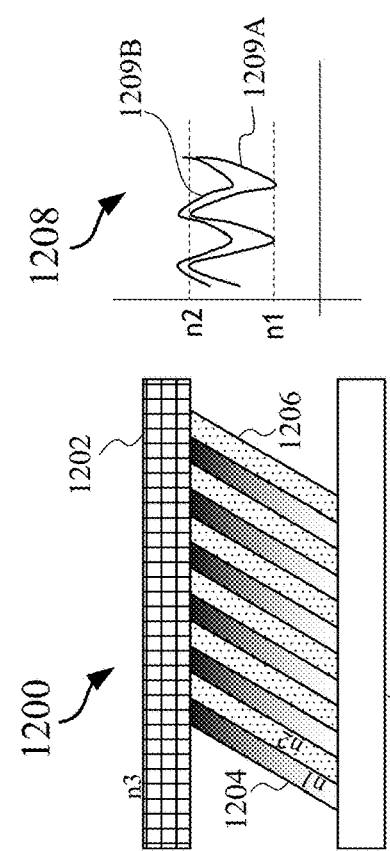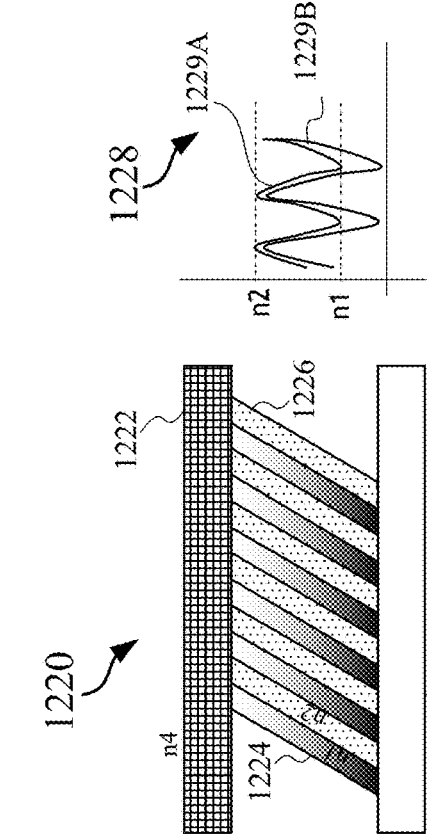
FIG. 12A
FIG. 12C

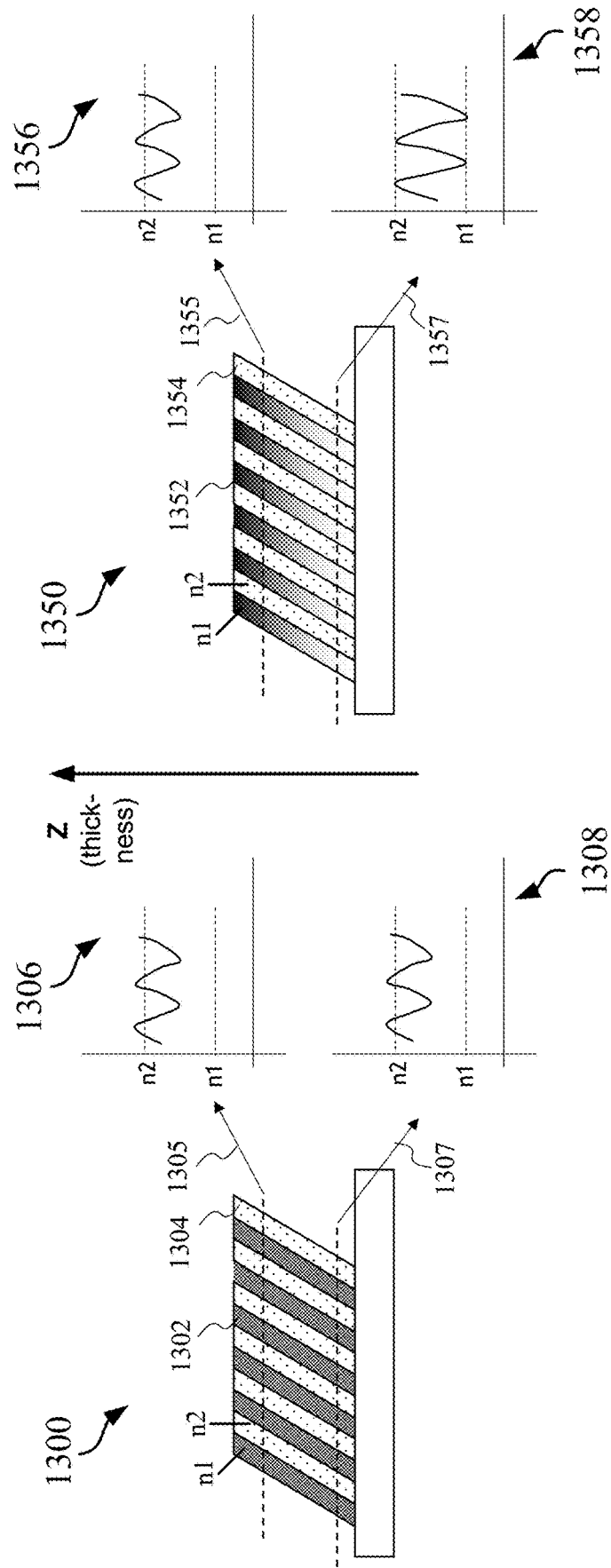

REFRACTIVE INDEX MODULATION MODIFICATION IN A HOLOGRAPHIC GRATING

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a holographic grating. In some implementations, the artificial reality systems may employ eye-tracking subsystems that can track the user's eye (e.g., gaze direction) to modify or generate content based on the direction in which the user is looking, thereby providing a more immersive experience for the user. The eye-tracking subsystems may be implemented using various optical components, such as holographic optical elements.

SUMMARY

This disclosure relates generally to holographic optical elements. According to certain embodiments, a holographic grating may include a polymer layer. The polymer layer includes a first region characterized by a first refractive index, a second region characterized by a second refractive index, the second refractive index being higher than the first refractive index, and a plurality of nanoparticles dispersed in the polymer layer, the nanoparticles having a higher concentration in either the first region or the second region.

According to some embodiments, in the holographic grating, the nanoparticles are monomers. In some embodiments, the nanoparticles have the higher concentration in the second region and the nanoparticles have a third refractive index that is higher than the second refractive index. In some embodiments, the nanoparticles have the higher concentration in the first region and the nanoparticles have a third refractive index that is lower than the first refractive index. In some embodiments, the nanoparticles in the first region or the second region have a substantially constant concentration with respect to a thickness of the polymer layer. In some embodiments, the polymer layer comprises a multiplexed volume Bragg grating.

According to certain embodiments, a grating includes a polymer layer. The polymer layer includes a first region characterized by a first refractive index, a second region characterized by a second refractive index, the second refractive index being higher than the first refractive index, and a plurality of nanoparticles dispersed in the polymer layer, the nanoparticles having a higher concentration in proximity to a surface of the polymer layer in one or more of the first region or the second region, such that a refractive index modulation of the grating is apodized.

According to certain embodiments, in the grating, the nanoparticles are monomers. In some embodiments, the nanoparticles have the higher concentration in the first region and the nanoparticles have a third refractive index that is higher than the first refractive index In some embodiments, the nanoparticles have the higher concentration in the second region and the nanoparticles have a third refractive index that is lower than the second refractive index. In some embodiments, the polymer layer comprises a multiplexed volume Bragg grating.

According to certain embodiments, a holographic grating may include a polymer matrix. The polymer matrix includes a first region characterized by a first refractive index and a second region characterized by a second refractive index, the second refractive index being higher than the first refractive index. The holographic grating further includes a resin layer disposed on the polymer matrix, the resin layer comprising a support layer and a first plurality of nanoparticles dispersed in the support layer of the resin layer.

According to certain embodiments, in the holographic grating, the nanoparticles are monomers. In some embodiments, the polymer matrix further comprises a second plurality of nanoparticles, the second plurality of nanoparticles have a higher concentration in the second region than in the first region, and the second plurality of nanoparticles have a third refractive index that is higher than the second refractive index. In some embodiments, the polymer matrix further comprises a second plurality of nanoparticles, the second plurality of nanoparticles have a higher concentration in the first region than in the second region, and the second plurality of nanoparticles have a third refractive index that is lower than the first refractive index. In some embodiments, the nanoparticles in a given region have a substantially constant concentration with respect to a thickness of the polymer matrix. In some embodiments, the polymer matrix comprises a multiplexed volume Bragg grating.

According to certain embodiments, a holographic grating may be fabricated by the following process. A holographic recording material layer is obtained. The holographic recording material layer is exposed to a recording light pattern, the recording light pattern creating, in the holographic recording material layer, a first region having a first refractive index and a second region having second refractive index that is higher than the first refractive index. After exposing the holographic recording material layer to the recording light pattern, a first resin layer comprising a first plurality of nanoparticles is applied to the holographic recording material layer, thereby causing diffusion of at least a portion of the first plurality of nanoparticles into the holographic recording material layer.

According to certain embodiments, in the fabricated holographic grating, the first plurality of nanoparticles has a third refractive index that is higher than the second refractive index and the first plurality of nanoparticles preferentially diffuses into the second region. In some embodiments, the first plurality of nanoparticles has a third refractive index that is lower than the second refractive index and the first plurality of nanoparticles preferentially diffuses so as to be more highly concentrated in proximity to one or more of a top side or a bottom side of the second region. In some embodiments, the first plurality of nanoparticles has a third refractive index lower than the first refractive index and the first plurality of nanoparticles preferentially diffuses into the first region. In some embodiments, the first plurality of nanoparticles has a third refractive index that is higher than the first refractive index; and the first plurality of nanoparticles further diffuses so as to be more highly concentrated in proximity to one or more of a top side or a bottom side of the first region. In some embodiments, the steps further comprise removing the first resin layer and disposing a substrate on the holographic recording material layer. In some embodiments, the steps further include applying a second resin layer comprising a second plurality of nanoparticles to the holographic recording material layer, thereby causing diffusion of at least a portion of the second plurality of nanoparticles into the holographic recording material layer. In some embodiments, the nanoparticles in a given region have a substantially constant concentration with respect to a thickness of the holographic recording material layer.

According to certain embodiments, a holographic grating may be fabricated by the following process. A holographic recording material layer is obtained. A first resin layer comprising a first plurality of nanoparticles is applied to the holographic recording material layer. After applying the first resin layer, the holographic recording material layer is exposed to a recording light pattern, the recording light pattern creating, in the holographic recording material layer, a first region having a first refractive index and a second region having second refractive index that is higher than the first refractive index, wherein at least a portion of the first plurality of nanoparticles diffuses from the first resin layer into the holographic recording material layer.

According to certain embodiments, in the fabricated holographic grating, the first plurality of nanoparticles has a third refractive index that is higher than the second refractive index and the first plurality of nanoparticles preferentially diffuses into the second region. In some embodiments, the first plurality of nanoparticles has a third refractive index that is lower than the second refractive index and the first plurality of nanoparticles diffuse so as to be more highly concentrated in proximity to a top side or a bottom side of the second region. In some embodiments, the first plurality of nanoparticles has a third refractive index lower than the first refractive index and the first plurality of nanoparticles preferentially diffuses into the first region. In some embodiments, the first plurality of nanoparticles has a third refractive index that is higher than the first refractive index and the first plurality of nanoparticles diffuse so as to be more highly concentrated in proximity to a top side or a bottom side of the first region. In some embodiments, the steps further include applying a second resin layer comprising a second plurality of nanoparticles to the holographic recording material layer, thereby causing diffusion of at least a portion of the second plurality of nanoparticles into the holographic recording material layer. In some embodiments, the nanoparticles in a given region have a substantially constant concentration with respect to a thickness of the holographic recording material layer.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5A illustrates an example of a volume Bragg grating (VBG). FIG. 5B illustrates the Bragg condition for the volume Bragg grating shown in FIG. 5A.

FIG. 6 illustrates an example of a holographic recording material including two-stage photopolymers.

FIGS. 11A-11C illustrate an example technique for modifying the refractive index modulation in a holographic grating.

FIGS. 12A-12D illustrate examples of refractive index modulation modification, according to some embodiments.

FIGS. 13A-13B illustrate variations in refractive index modulation modification in a grating, according to some embodiments.

Figure 1:
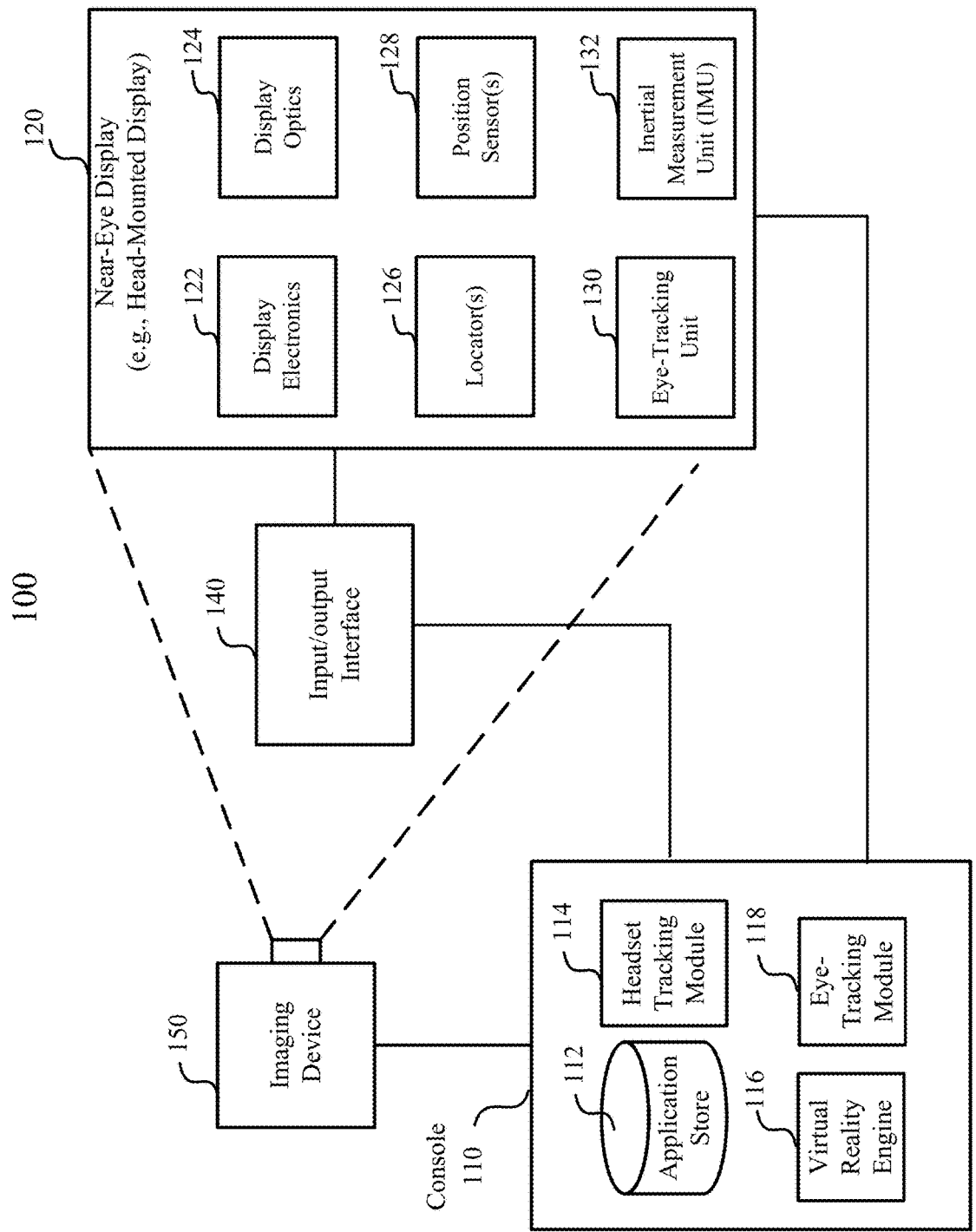
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to holographic optical elements. More specifically, and without limitation, this disclosure relates to modifying the refractive index of recorded holographic optical elements (HOEs) to enhance the refractive index modulation or apodize the recorded holographic optical elements, in order to improve the diffraction efficiency and/or the contrast of the displayed images by, for example, increasing the number of gratings in the multiplexed grating and reducing the sidelobes of a grating (and thus crosstalk between gratings in a multiplexed grating). Various inventive embodiments are described herein, including materials, systems, modules, devices, components, methods, compositions, and the like.

In various optical systems, such as artificial reality systems including virtual reality, augmented reality (AR), and mixed reality (MR) systems, to improve the performance of the optical systems, such as improving the brightness of the displayed images, expanding the eyebox, reducing artifacts, increasing the field of view, and improving user interaction with presented content, various holographic optical elements may be used for light beam coupling and shaping, such as coupling light into or out of a waveguide display or tracking the motion of the user's eyes. These holographic optical elements may need to have a high refractive index modulation, a small pitch or feature size, high clarity, high diffraction efficiency, and the like.

The diffraction efficiency of a holographic optical element is related to the difference in refractive index in different regions of a grating. Given the relatively small range of refractive index modulation available in materials suitable for recording a holographic grating, there is a limit on the diffraction efficiency achievable using traditional methods. Another limitation in these gratings is sidelobes in the diffraction pattern, which may affect image quality. In the case of multiplexed gratings, the sidelobes of a grating may overlap with the main lobes of other gratings, resulting in crosstalk. To reduce crosstalk, one option is to reduce the number of gratings multiplexed, which can be undesirable in many applications. Techniques described herein can be applied to increase the refractive index modulation in an HOE to improve diffraction efficiency, and/or to apodize a grating to eliminate or reduce sidelobes/crosstalk without limiting the number of gratings that may be multiplexed in a holographic material layer.

According to certain embodiments, a layer of resin material including a support matrix and monomers (or other nanoparticles) dispersed in the support matrix, such as a monomer reservoir buffer layer, may be formed on a photopolymer layer, either before or after the holographic recording in the photopolymer layer. Depending on, for example, the sizes of the monomers and the affinity between the monomers and the polymers in the recorded holographic optical elements, the monomers in the layer of resin material may more preferentially diffuse to the high refractive index regions of the HOE than to the low refractive index regions of the HOE, or more preferentially diffuse to the low refractive index regions than to the high refractive index regions. As such, the refractive index in the high refractive index regions (or the low refractive regions) may be changed more than the low refractive index regions (or the high refractive index regions). The changes may include increasing the refractive index in the diffused regions if the monomers in the layer of resin material have a higher refractive index than the refractive index in the diffused regions, or decreasing the refractive index in the diffused regions if the monomers in the layer of resin material have a lower refractive index than the refractive index in the diffused regions. Thus, the refractive index may be selectively increased or decreased in different regions to increase or decrease the refractive index modulation.

In some embodiments, the refractive index in the low refractive index regions of the HOE may be decreased by preferentially diffusing lower refractive index monomers to the low refractive index regions. In some embodiments, the refractive index in the high refractive index regions of the HOE may be increased by preferentially diffusing higher refractive index monomers to the high refractive index regions. In some embodiments, the refractive index in both the high and low refractive index regions of the HOE may be increased, but the refractive index in the high refractive index regions of the HOE may be increased more due to the preferential diffusion of higher index monomers. In some embodiments, the refractive index in both the high and low refractive index regions of the HOE may be decreased, but the refractive index in the low refractive index regions of the HOE may be decreased more due to the preferential diffusion of lower index monomers. Thus, the refractive index modulation of the HOE can be increased to increase the diffraction efficiency and/or to multiplex more gratings in a photopolymer material layer.

In some embodiments, the layer of resin material may include a lower concentration of monomers or the diffusion may be controlled to occur in limited time, and thus the monomers may not diffuse through the full depth of the HOE. As a result, the HOE may have different refractive index modulations at different depths. For example, the monomers in the layer of resin material may have a lower refractive index and may more preferentially diffuse into the high refractive index regions through a certain thickness of the HOE such that the refractive index modulation may taper from the center of the HOE in the thickness direction. In some embodiments, the layer of resin material including the support matrix and monomers may be formed on opposite sides of the photopolymer layer, such that the refractive index modulation may taper from the center of the HOE in the thickness direction to the opposite sides, forming a bell-shaped refractive index modulation profile. Thus, the HOE may be apodized to reduce sidelobes in the diffraction efficiency curves and thus crosstalk between gratings in a multiplexed grating.

In some embodiments, the layer of resin material including the support matrix and monomers (or other nanoparticles) dispersed in the support matrix may be formed after the HOE is recorded and a cover layer is removed, and may or may not remain in the final device after the diffusion of the monomers in the layer of resin material. In some embodiments, the layer of resin material (e.g., the monomer reservoir buffer layer) may be formed on the photopolymer layer before the holographic recording and may or may not remain in the final device. For example, the support matrix of the monomer reservoir buffer layer may be similar to a substrate and may remain in the final device after the monomers diffuse into the HOE.

As used herein, visible light may refer to light with a wavelength between about 380 nm and about 750 nm, between about 400 nm and about 700 nm, or between about 440 nm and about 650 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS), a charge-coupled device (CCD) sensor, or an InGaAs sensor), such as between 830 nm and 860 nm, between 930 nm and 980 nm, or between about 750 nm to about 1000 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

As also used herein, the term "support matrix" refers to the material, medium, substance, etc., in which the polymerizable component is dissolved, dispersed, embedded, enclosed, etc. In some embodiments, the support matrix is typically a low $T_g$ polymer. The polymer may be organic, inorganic, or a mixture of the two. Without being particularly limited, the polymer may be a thermoset or thermoplastic.

As also used herein, the term "polymerizable component" refers to one or more photoactive polymerizable materials, and possibly one or more additional polymerizable materials, e.g., monomers and/or oligomers, that are capable of forming a polymer.

As also used herein, the term "photoactive polymerizable material" refers to a monomer, an oligomer and combinations thereof that polymerize in the presence of a photoinitiator that has been activated by being exposed to a photoinitiating light source, e.g., recording light. In reference to the functional group that undergoes curing, the photoactive polymerizable material comprises at least one such functional group. It is also understood that there exist photoactive polymerizable materials that are also photoinitiators, such as N-methylmaleimide, derivatized acetophenones, etc., and that in such a case, it is understood that the photoactive monomer and/or oligomer of the present disclosure may also be a photoinitiator.

As also used herein, the term "photopolymer" refers to a polymer formed by one or more photoactive polymerizable materials, and possibly one or more additional monomers and/or oligomers.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional imaging device 150, and an optional input/output interface 140 that may each be coupled to an optional console 110. While FIG. 1 shows example artificial reality system environment 100 including one near-eye display system 120, one imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include imaging device 150, optional input/output interface 140, and optional console 110. In alternative configurations, different or additional components may be included in artificial reality system environment 100. In some configurations, near-eye display systems 120 may include imaging device 150, which may be used to track one or more input/output devices (e.g., input/output interface 140), such as a handhold controller.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120/

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

Imaging device 150 may be part of near-eye display system 120 or may be external to near-eye display system 120. Imaging device 150 may generate slow calibration data based on calibration parameters received from console 110. Slow calibration data may include one or more images showing observed positions of locators 126 that are detectable by imaging device 150. Imaging device 150 may include one or more cameras, one or more video cameras, any other device capable of capturing images including one or more of locators 126, or some combinations thereof. Additionally, imaging device 150 may include one or more filters (e.g., to increase signal to noise ratio). Imaging device 150 may be configured to detect light emitted or reflected from locators 126 in a field of view of imaging device 150. In embodiments where locators 126 include passive elements (e.g., retroreflectors), imaging device 150 may include a light source that illuminates some or all of locators 126, which may retro-reflect the light to the light source in imaging device 150. Slow calibration data may be communicated from imaging device 150 to console 110, and imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transform or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, imaging device 150 may be used to track input/output interface 140, such as tracking the location or position of a controller (which may include, for example, an IR light source) or a hand of the user to determine the motion of the user. In some embodiments, near-eye display 120 may include one or more imaging devices (e.g., imaging device 150) to track input/output interface 140, such as tracking the location or position of a controller or a hand of the user to determine the motion of the user.

Console 110 may provide content to near-eye display system 120 for presentation to the user in accordance with information received from one or more of imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display system 120 using slow calibration information from imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
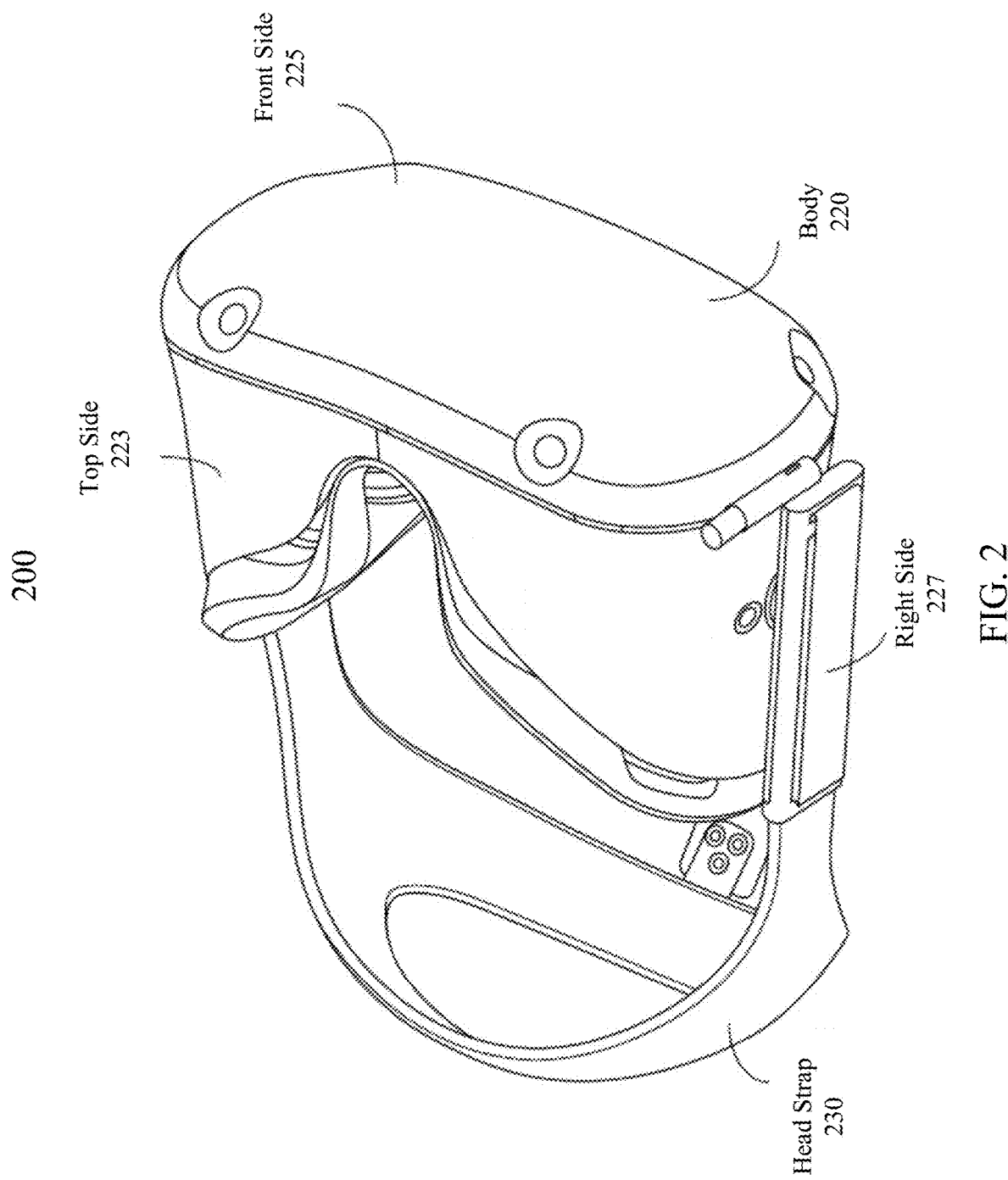
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
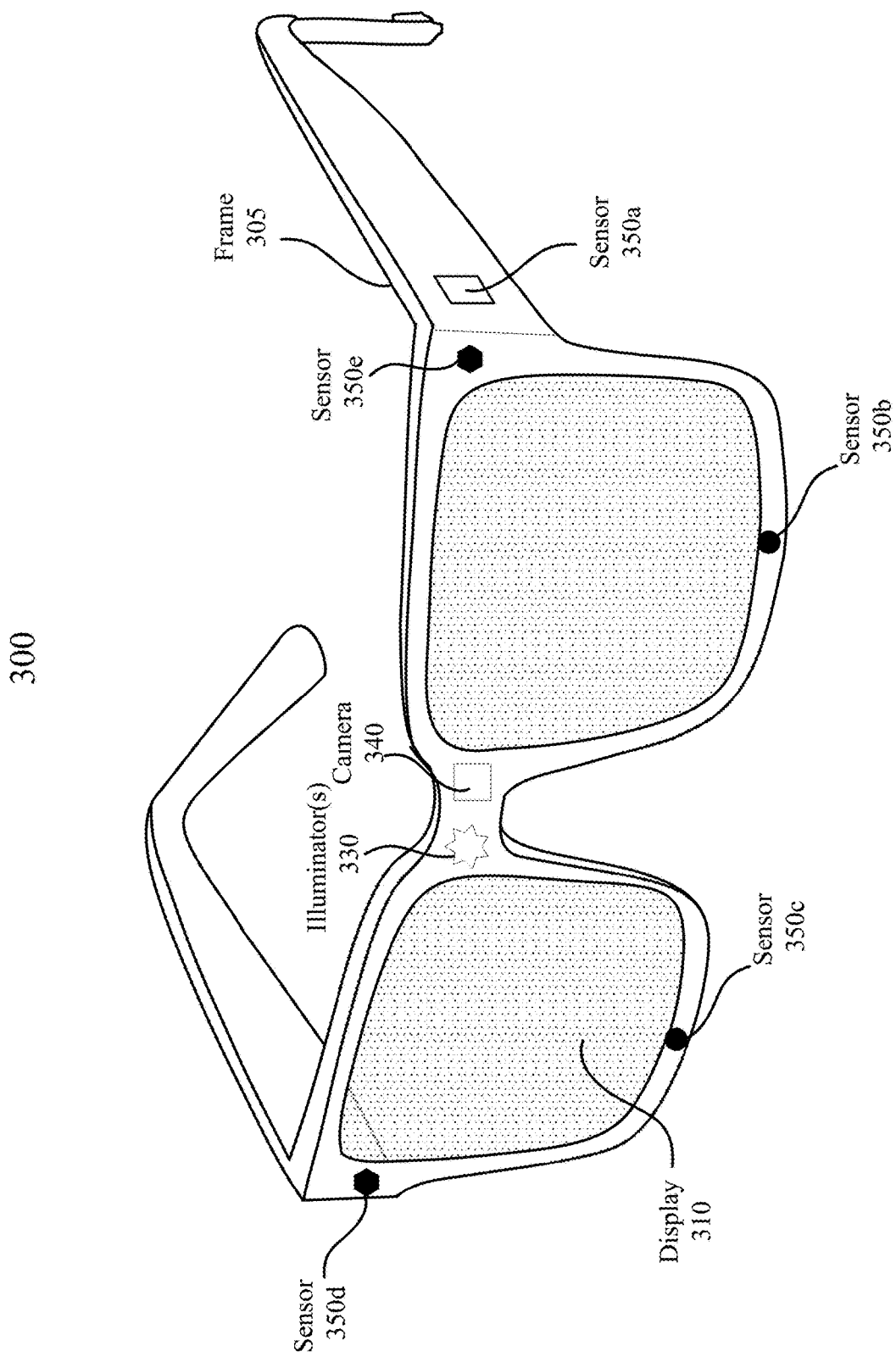
FIG. 3 is a perspective view of an example of a near-eye display system in the form of a pair of glasses for implementing some of the examples disclosed herein.

FIG. 3 is a perspective view of an example of a near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display system 300, and/or to provide an interactive VR/AR/MR experience to a user of near-eye display system 300. In some embodiments, sensors 350a-350e may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
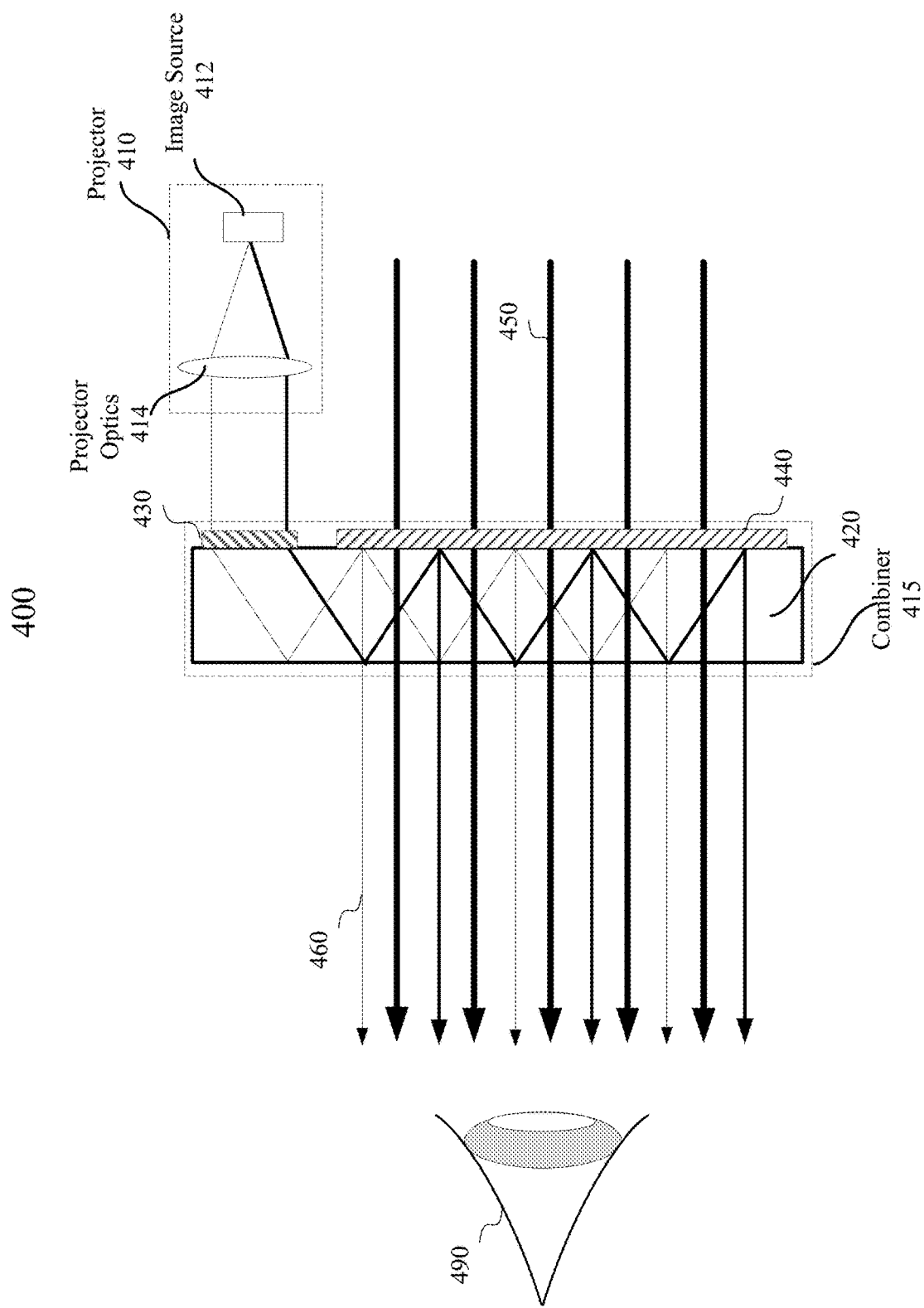
FIG. 4 illustrates an example of an optical see-through augmented reality system using a waveguide display that includes an optical combiner according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical elements (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

In addition, as described above, in an artificial reality system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. One technique (referred to as Pupil Center Corneal Reflection or PCCR method) involves using NIR LEDs to produce glints on the eye cornea surface and then capturing images/videos of the eye region. Gaze direction can be estimated from the relative movement between the pupil center and glints. Various holographic optical elements may be used in an eye-tracking system for illuminating the user's eyes or collecting light reflected by the user's eye.

One example of the holographic optical elements used in an artificial reality system for eye tracking or image display may be a holographic volume Bragg grating, which may be recorded on a holographic material layer by exposing the holographic material layer to light patterns generated by the interference between two or more coherent light beams.

FIG. 5A illustrates an example of a volume Bragg grating (VBG) 500. Volume Bragg grating 500 shown in FIG. 5A may include a transmission holographic grating that has a thickness D. The refractive index n of volume Bragg grating 500 may be modulated at an amplitude $n_1$, and the grating period of volume Bragg grating 500 may be Λ. Incident light 510 having a wavelength λ may be incident on volume Bragg grating 500 at an incident angle θ, and may be refracted into volume Bragg grating 500 as incident light 520 that propagates at an angle $θ_n$ in volume Bragg grating 500. Incident light 520 may be diffracted by volume Bragg grating 500 into diffraction light 530, which may propagate at a diffraction angle $θ_d$ in volume Bragg grating 500 and may be refracted out of volume Bragg grating 500 as diffraction light 540.

FIG. 5B illustrates the Bragg condition for volume Bragg grating 500 shown in FIG. 5A. Vector 505 represents the grating vector $\vec{G}$, where $|\vec{G}|=2\pi r/\Lambda$. Vector 525 represents the incident wave vector $\vec{k}_i$, and vector 535 represents the diffract wave vector $\vec{k}_d$, where $|\vec{k}_i|=|\vec{k}_d|=2\pi n/\lambda$. Under the Bragg phase-matching condition, $\vec{k}_i - \vec{k}_i = \vec{G}$. Thus, for a given wavelength $\lambda$, there may only be one pair of incident angle $\theta$ (or $\theta_n$) and diffraction angle $\theta_d$ that meets the Bragg condition perfectly. Similarly, for a given incident angle $\theta$, there may only be one wavelength $\lambda$ that meets the Bragg condition perfectly. As such, the diffraction may only occur in a small wavelength range and a small incident angle range. The diffraction efficiency, the wavelength selectivity, and the angular selectivity of volume Bragg grating 500 may be functions of thickness D of volume Bragg grating 500. For example, the full-width-half-magnitude (FWHM) wavelength range and the FWHM angle range of volume Bragg grating 500 at the Bragg condition may be inversely proportional to thickness D of volume Bragg grating 500, while the maximum diffraction efficiency at the Bragg condition may be a function $\sin^2(a \times n_1 \times D)$, where a is a coefficient. For a reflection volume Bragg grating, the maximum diffraction efficiency at the Bragg condition may be a function of $\tanh^2(a \times n_1 \times D)$.

In some embodiments, a multiplexed Bragg grating may be used to achieve the desired optical performance, such as a high diffraction efficiency and a large field of view (FOV) for the full visible spectrum (e.g., from about 400 nm to about 700 nm, or from about 440 nm to about 650 nm). Each part of the multiplexed Bragg grating may be used to diffract light from a respective FOV range and/or within a respective wavelength range. Thus, in some designs, multiple volume Bragg gratings each recorded under a respective recording condition may be used.

The holographic optical elements described above may be recorded in a holographic material (e.g., photopolymer) layer. In some embodiments, the HOEs can be recorded first and then laminated on a substrate in a near-eye display system. In some embodiments, a holographic material layer may be coated or laminated on the substrate and the HOEs may then be recorded in the holographic material layer.

In general, to record a holographic optical element in a photosensitive material layer, two coherent beams may interfere with each other at certain angles to generate a unique interference pattern in the photosensitive material layer, which may in turn generate a unique refractive index modulation pattern in the photosensitive material layer, where the refractive index modulation pattern may correspond to the light intensity pattern of the interference pattern. The photosensitive material layer may include, for example, silver halide emulsion, dichromated gelatin, photopolymers including photo-polymerizable monomers suspended in a polymer matrix, photorefractive crystals, and the like. One example of the photosensitive material layer for holographic recording is two-stage photopolymers.

FIG. 6 illustrates an example of a holographic recording material including two-stage photopolymers. The raw material 610 of the two-stage photopolymers may be a resin including matrix precursors 612 and imaging components 614. Matrix precursors 612 in raw material 610 may include monomers that may be thermally or otherwise cured at the first stage to polymerize and to form a photopolymer film 620 that includes a cross-linked matrix formed by polymeric binders 622. Imaging components 614 may include writing monomers and polymerization initiating agents, such as photosensitizing dyes, initiators, and/or chain transfer agents. Thus, photopolymer film 620 may include polymeric binders 622, writing monomers (e.g., acrylate monomers), and initiating agents, such as photosensitizing dyes, initiators, and/or chain transfer agents. Polymeric binders 622 may act as the backbone or the support matrix for the writing monomers and initiating agents. For example, in some embodiments, polymeric binders 622 may include a low refractive index (e.g., <1.5) rubbery polymer (e.g., a polyurethane), which may provide mechanical support during the holographic exposure and ensure the refractive index modulation by the light pattern is permanently preserved.

Imaging components 614 including the writing monomers and the polymerization initiating agents may be dispersed in the support matrix. The writing monomers may serve as refractive index modulators. For example, the writing monomers may include high refractive index acrylate monomers which can react with the initiators and polymerize. The photosensitizing dyes may be used to absorb light and interact with the initiators to produce active species, such as radicals, cations (e.g., acids), or anion (e.g., bases). The active species (e.g., radicals) may initiate the polymerization by attacking a monomer. For example, in some monomers, one electron pair may be held securely between two carbons in a sigma bond and another electron pair may be more loosely held in a pi bond, and the free radical may use one electron from the pi bond to form a more stable bond with a first carbon atom in the two carbon atoms. The other electron from the pi bond may return to the second carbon atom in the two carbon atoms and turn the whole molecule into another radical. Thus, a monomer chain (e.g., a polymer) may be formed by adding additional monomers to the end of the monomer chain and transferring the radical to the end of the monomer chain to attack and add more monomers to the chain.

During the recording process (e.g., the second stage), an interference pattern generated by the interference between two coherent beams may cause the photosensitizing dyes and the initiators in the bright fringes to generate active species, such as radicals, cations (e.g., acids), or anion (e.g., bases), from the initiators, where the active species (e.g., radicals) may transfer from the initiators to monomers and cause the polymerization of the monomers in the bright fringes as described above. The initiators or radicals may be bound to the polymer matrix when abstracting the hydrogen atoms on the polymer matrix. The radicals may be transferred to the ends of the chains of monomers to add more monomers to the chains. While the monomers in the bright fringes are attached to chains of monomers, monomers in the unexposed dark regions may diffuse to the bright fringes to enhance the polymerization. As a result, polymerization concentration and density gradients may be formed in photopolymer film 620, resulting in refractive index modulation in photopolymer film 620 due to the higher refractive index of the writing monomers. For example, areas with a higher concentration of monomers and polymerization may have a higher refractive index. Thus, a hologram or a holographic optical element 630 may be formed in photopolymer film 620.

During the exposure, a radical at the end of one monomer chain may combine with a radical at the end of another monomer chain to form a longer chain and terminate the polymerization. In addition to the termination due to radical combination, the polymerization may also be terminated by disproportionation of polymers, where a hydrogen atom from one chain may be abstracted to another chain to generate a polymer with a terminal unsaturated group and a polymer with a terminal saturated group. The polymerization may also terminated due to interactions with impurities or inhibitors (e.g., oxygen). In addition, as the exposure and polymerization proceed, fewer monomers may be available for diffusion and polymerization, and thus the diffusion and polymerization may be suppressed. The polymerization may stop until there are no more monomers or until the monomer chains terminate for an exposure. After all or substantially all monomers have been polymerized, no more new holographic optical elements 630 (e.g., gratings) may be recorded in photopolymer film 620.

In some embodiments, the recorded holographic optical elements in the photosensitive material layer may be UV cured or thermally cured or enhanced, for example, for dye bleaching, completing polymerization, permanently fixing the recorded pattern, and enhancing the refractive index modulation. At the end of the process, a holographic optical element, such as a holographic grating, may be formed. The holographic grating may be a volume Bragg grating with a thickness of, for example, a few, or tens, or hundreds of microns.

To generate the desired light interference pattern for recording the HOEs, two or more coherent beams may generally be used, where one beam may be a reference beam and another beam may be an object beam that may have a desired wavefront profile. When the recorded HOEs are illuminated by the reference beam, the object beam with the desired wavefront profile may be reconstructed.

In some embodiments, the holographic optical elements may be used to diffract light outside of the visible band. For example, IR light or NIR light (e.g., at 940 nm or 850 nm) may be used for eye-tracking. Thus, the holographic optical elements may need to diffract IR or NIR light, but not the visible light. However, there may be very few holographic recording materials that are sensitive to infrared light. As such, to record a holographic grating that can diffract infrared light, recording light at a shorter wavelength (e.g., in visible or UV band, such as at about 660 nm, about 532 nm, about 514 nm, or about 457 nm) may be used, and the recording condition (e.g., the angles of the two interfering coherent beams) may be different from the reconstruction condition.

Figure 7B:
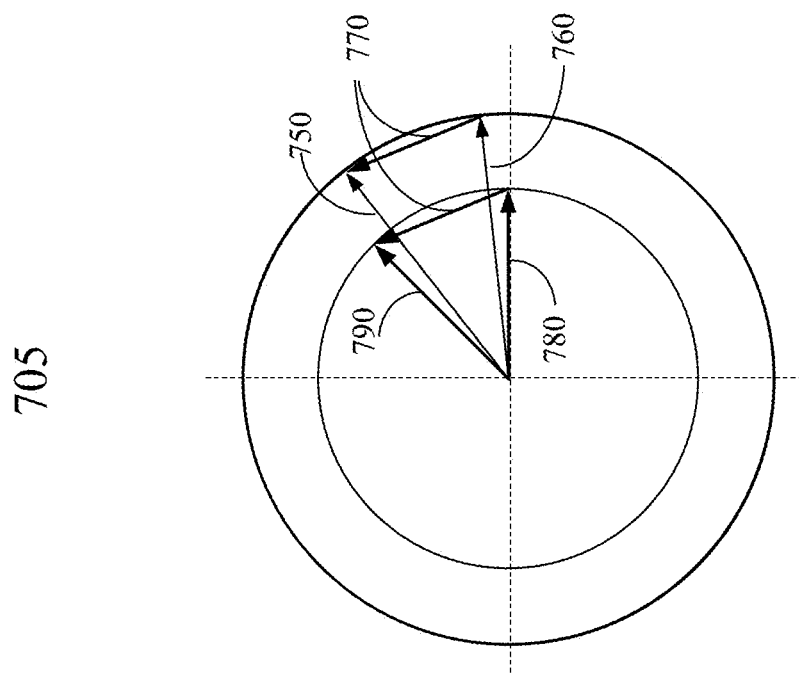
FIG. 7B is an example of a holography momentum diagram illustrating the wave vectors of recording beams and reconstruction beams and the grating vector of the recorded volume Bragg grating.
Figure 7A:
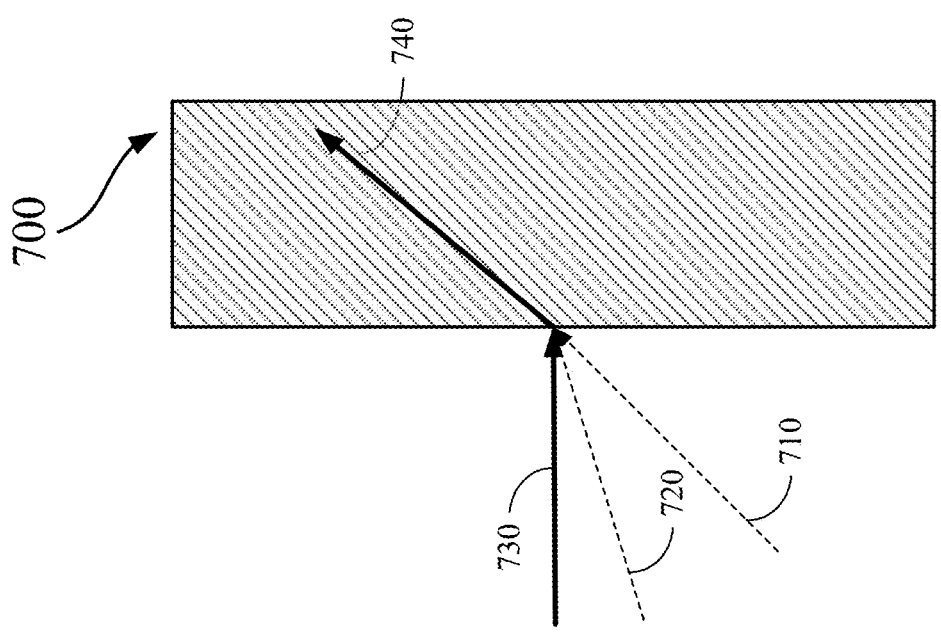
FIG. 7A illustrates the recording light beams for recording a volume Bragg grating and the light beam reconstructed from the volume Bragg grating.

FIG. 7A illustrates the recording light beams for recording a volume Bragg grating 700 and the light beam reconstructed from volume Bragg grating 700. In the example illustrated, volume Bragg grating 700 may include a transmission volume hologram recorded using a reference beam 720 and an object beam 710 at a first wavelength, such as 660 nm. When a light beam 730 at a second wavelength (e.g., 940 nm) is incident on volume Bragg grating 700 at a 0° incident angle, the incident light beam 730 may be diffracted by volume Bragg grating 700 at a diffraction angle as shown by a diffracted beam 740.

FIG. 7B is an example of a holography momentum diagram 705 illustrating the wave vectors of recording beams and reconstruction beams and the grating vector of the recorded volume Bragg grating. FIG. 7B shows the Bragg matching conditions during the holographic grating recording and reconstruction. The length of wave vectors 750 and 760 of the recording beams (e.g., object beam 710 and reference beam 710) may be determined based on the recording light wavelength $\lambda_c$ (e.g., 660 nm) according to $2\pi/\lambda_c$, where n is the average refractive index of holographic material layer. The directions of wave vectors 750 and 760 of the recording beams may be determined based on the desired grating vector K (770) such that wave vectors 750 and 760 and grating vector K (770) can form an isosceles triangle as shown in FIG. 7B. Grating vector K may have an amplitude $2\pi/\Lambda$, where $\Lambda$ is the grating period. Grating vector K may in turn be determined based on the desired reconstruction condition. For example, based on the desired reconstruction wavelength $\lambda_r$ (e.g., 940 nm) and the directions of the incident light beam (e.g., light beam 730 at 0°) and the desired diffracted light beam (e.g., diffracted beam 740), grating vector K (770) of volume Bragg grating 700 may be determined based on the Bragg condition, where wave vector 780 of the incident light beam (e.g., light beam 730) and wave vector 790 of the diffracted light beam (e.g., diffracted beam 740) may have an amplitude $2\pi n/\lambda_r$, and may form an isosceles triangle with grating vector K (770) as shown in FIG. 7B.

As described above, for a given wavelength, there may only be one pair of incident angle and diffraction angle that meets the Bragg condition perfectly. Similarly, for a given incident angle, there may only be one wavelength that meets the Bragg condition perfectly. When the incident angle of the reconstruction light beam is different from the incident angle that meets the Bragg condition of the volume Bragg grating or when the wavelength of the reconstruction light beam is different from the wavelength that meets the Bragg condition of the volume Bragg grating, the diffraction efficiency may be reduced as a function of the Bragg mismatch factor caused by the angular or wavelength detuning from the Bragg condition. As such, the diffraction may only occur in a small wavelength range and a small incident angle range.

Figure 8:
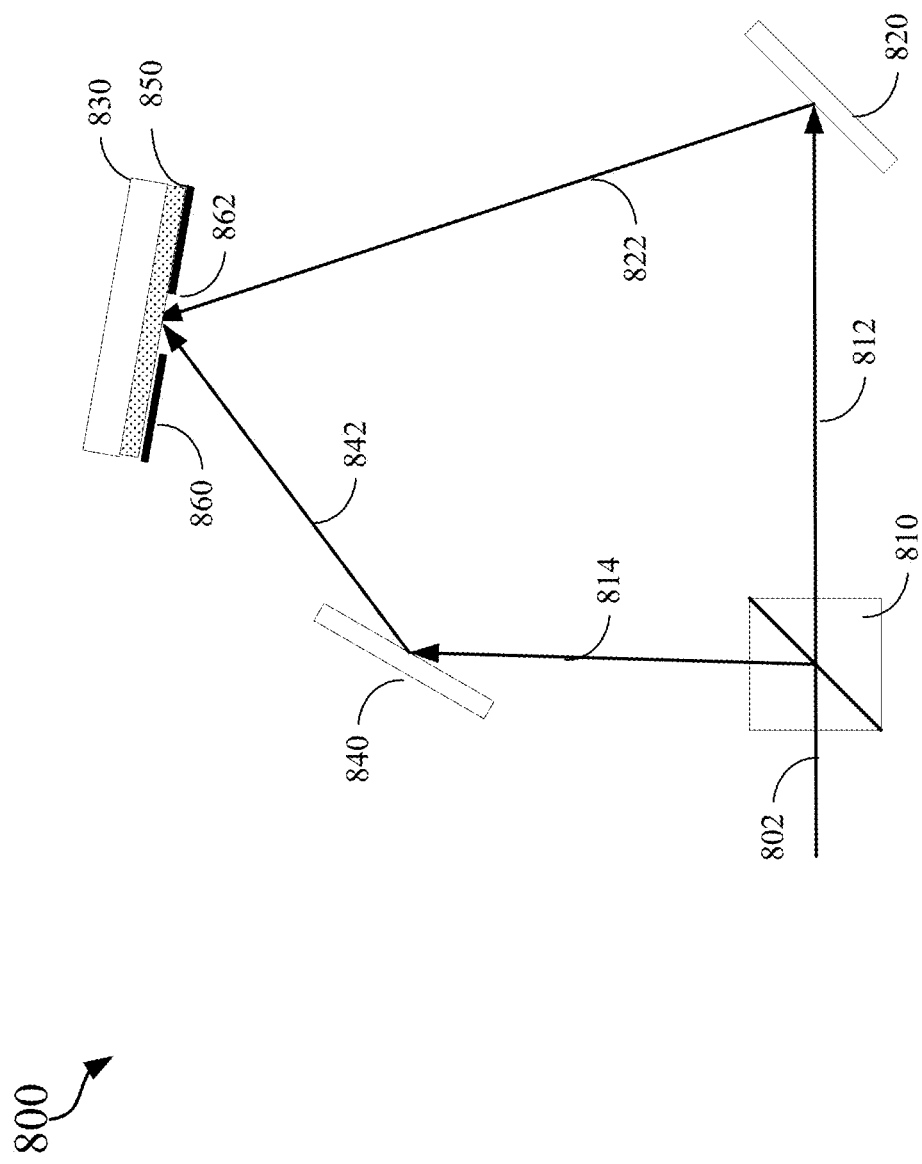
FIG. 8 illustrates an example of a holographic recording system for recording holographic optical elements.

FIG. 8 illustrates an example of a holographic recording system 800 for recording holographic optical elements. Holographic recording system 800 includes a beam splitter 810 (e.g., a beam splitter cube), which may split an incident collimated laser beam 802 into two light beams 812 and 814 that are coherent and have similar intensities. Light beam 812 may be reflected by a first mirror 820 towards a plate 830 as shown by the reflected light beam 822. On another path, light beam 814 may be reflected by a second mirror 840. The reflected light beam 842 may be directed towards plate 830, and may interfere with light beam 822 at plate 830 to generate an interference pattern that may include bright fringes and dark fringes. In some embodiments, plate 830 may also be a mirror. A holographic recording material layer 850 may be formed on plate 830 or on a substrate mounted on plate 830. The interference pattern may cause the holographic optical element to be recorded in holographic recording material layer 850 as described above.

In some embodiments, a mask 860 may be used to record different HOEs at different regions of holographic recording material layer 850. For example, mask 860 may include an aperture 862 for the holographic recording and may be moved to place aperture 862 at different regions on holographic recording material layer 850 to record different HOEs at the different regions under different recording conditions (e.g., recording beams with different angles).

Holographic recording materials can be selected for specific applications based on some parameters of the holographic recording materials, such as the spatial frequency response, dynamic range, photosensitivity, physical dimensions, mechanical properties, wavelength sensitivity, and development or bleaching method for the holographic recording material.

The dynamic range indicates the refractive index change that can be achieved in a holographic recording material. The dynamic range may affect, for example, the thickness of the device to achieve a high efficiency, and the number of holograms that can be multiplexed in a holographic material layer. The dynamic range may be represented by the refractive index modulation (RIM), which may be one half of the total change in refractive index. In generally, a large refractive index modulation in the holographic optical elements is desired in order to improve the diffraction efficiency and record multiple holographic optical elements in a same holographic material layer. However, for holographic photopolymer materials, due to the solubility limitation of the monomers in the holographic photopolymer materials, the maximum achievable refractive index modulation or dynamic range may be limited.

The spatial frequency response is a measure of the feature size that the holographic material can record and may dictate the types of Bragg conditions that can be achieved. The spatial frequency response can be characterized by a modulation transfer function, which may be a curve depicting the sinusoidal waves of varying frequencies. In general, a single spatial frequency value may be used to represent the frequency response, which may indicate the spatial frequency value at which the refractive index modulation begins to drop or at which the refractive index modulation is reduced by 3 dB. The spatial frequency response may also be represented by lines/mm, line pairs/mm, or the period of the sinusoid.

The photosensitivity of the holographic recording material may indicate the photo-dosage used to achieve a certain efficiency, such as 100% (or 1% for photo-refractive crystals). The physical dimensions that can be achieved in a particular holographic material may affect the aperture size as well as the spectral selectivity of the HOE device. Physical parameters of holographic recording materials may include, for example, damage thresholds and environmental stability. The wavelength sensitivity may be used to select the light source for the recording setup and may also affect the minimum achievable period. Some materials may be sensitive to light in a wide wavelength range. Many holographic materials may need post-exposure development or bleaching. Development considerations may include how the holographic material is developed or otherwise processed after the recording.

To record holographic optical elements for artificial reality system, it may be desirable that the photopolymer material is sensitive to visible light, can produce a large refractive index modulation Δn (e.g., high dynamic range), and have temporally and spatially controllable reaction and/or diffusion of the monomers and/or polymers such that chain transfer and termination reactions can be suppressed.

Figure 9:
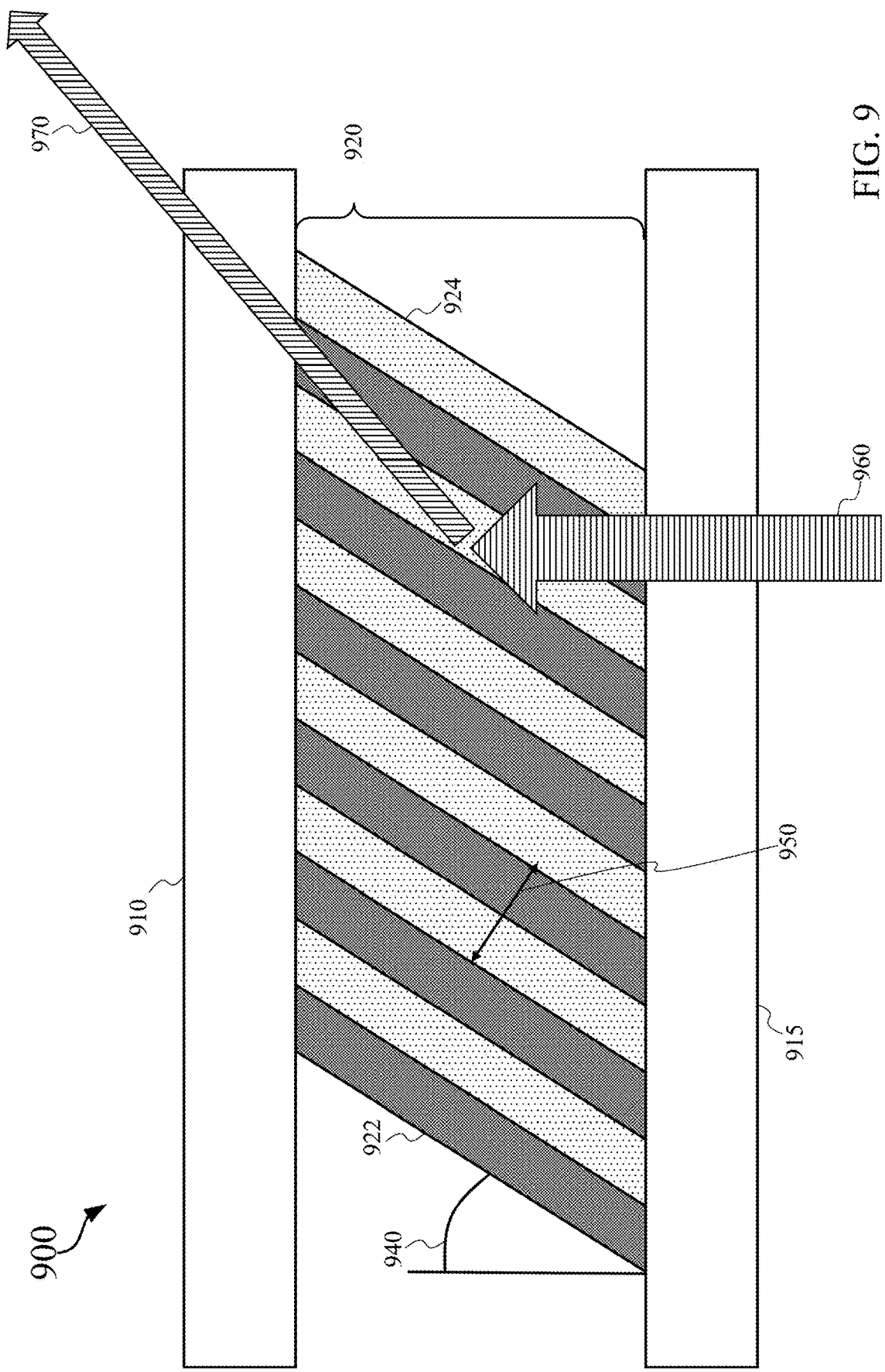
FIG. 9 illustrates an example of a grating including regions of different refractive index.

FIG. 9 illustrates an example of a grating 900. The grating 900 includes two substrate layers 910, 915 and a polymer layer 920. The grating 900 may correspond to a volume Bragg grating and/or a multiplexed volume Bragg grating.

In some embodiments, the first substrate 910 is disposed on a first side of the polymer layer 920. The first substrate 910 may be composed of, for example, glass, quartz, plastic, polymer, or any other suitable material which is transparent to visible light and NIR light. A thickness of the first substrate 910 may range from about 0.1 mm to about 10 mm. In some embodiments, the first substrate 910 may not be included and/or may be substituted with another component.

In some embodiments, second substrate 915 is disposed on a second side of the polymer layer 920. The second substrate 915 may be composed of, for example, glass, quartz, plastic, polymer, or any other suitable material which is transparent to visible light and NIR light. A thickness of the second substrate 915 may range from about 0.1 mm to about 10 mm. In some embodiments, the second substrate 915 may not be included and/or may be substituted with another component.

The polymer layer 920 includes first regions 922 having a first refractive index (n1), and second regions 924 having a second refractive index (n2). The second regions may have a refractive index higher than the first regions (or vice versa). The refractive index difference between the regions (e.g., |n1−n2|) may be between approximately 0 and about 0.2.

In addition to the refractive indexes of the regions 922, 924, the grating 900 is characterized by the slant angle θ (940) of the fringes and the pitch 950. The slant angle θ (940) of the fringes may be between approximately 0 degrees and about 90 degrees. The pitch 950, may be between approximately 0.1 and about 1.5 μm.

The parameters θ (940) and pitch 950 may affect the behavior of incident light 960 approaching the grating 900. Based on these parameters, along with other parameters such as the relative refractive indexes in the grating, diffracted light 970 may have certain power and may be in a certain direction. The diffraction efficiency of the grating 900 is the ratio between power of diffracted light and power of incident light.

Figures 10A, 10B:
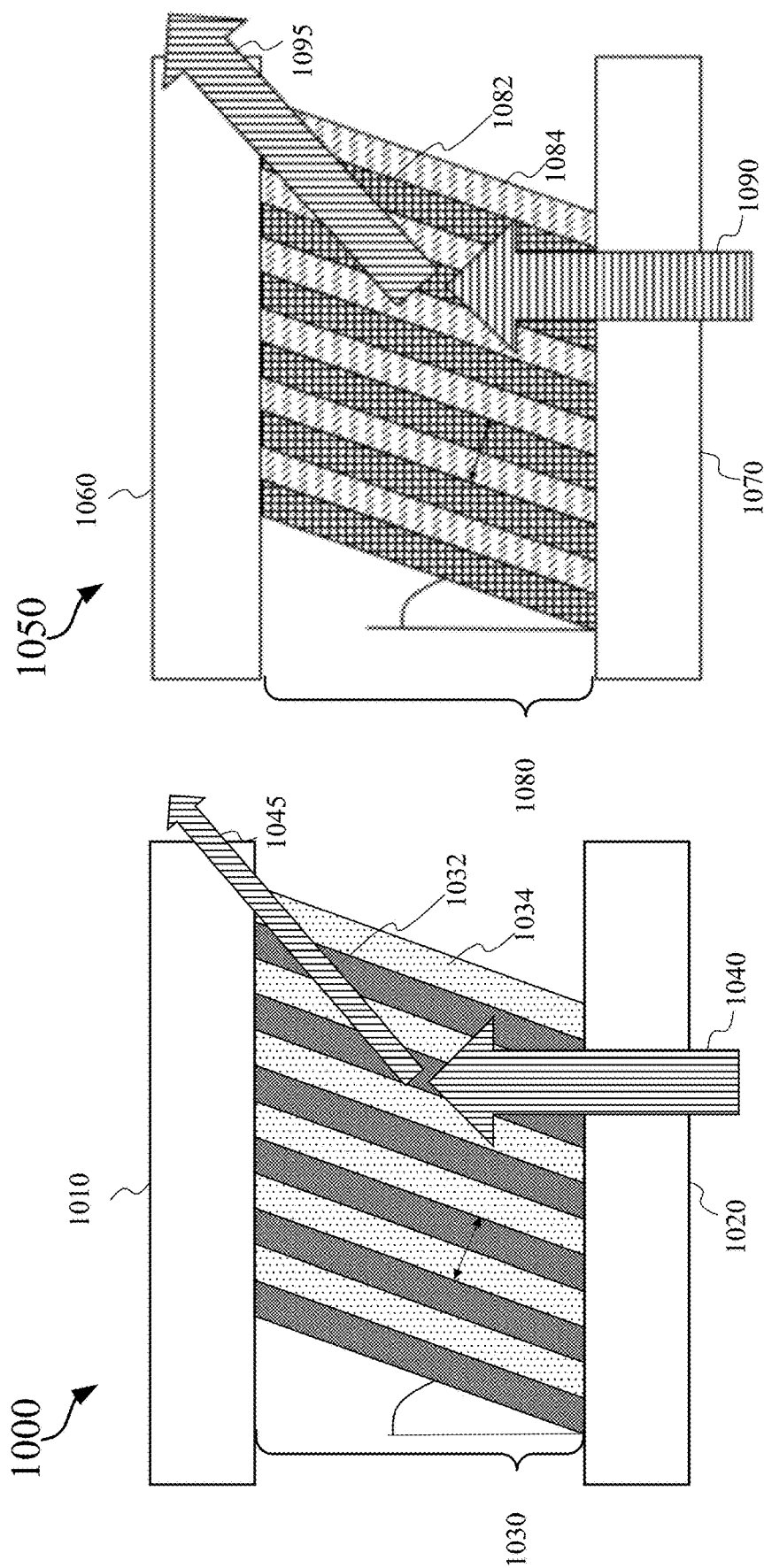
FIGS. 10A-10B illustrate an example of modifying refractive index modulation in a holographic grating.

FIGS. 10A-10B illustrate examples of gratings with a modified refractive index modulation according to some embodiments. The diffractive efficiency may increase as the refractive index difference between regions in the grating increases within a certain range. Similarly, the diffractive efficiency may decrease as the refractive index difference between regions in the grating decreases within a certain range. In some cases, it may be desirable to increase the refractive index difference between the regions. This can be achieved by modifying the refractive indexes in the regions, as illustrated in FIGS. 10A and 10B.

FIG. 10A illustrates a grating 1000 with a certain initial refractive index modulation and diffraction efficiency. The grating 1000 includes two substrate layers 1010 and 1020 and a polymer layer 1030 which includes regions 1032 and 1034. Each region 1032 is a region of relatively high refractive index (as compared to each region 1034). Each region 1034 is a region of relatively low refractive index (as compared to each region 1032). When incident light 1040 passes through the grating 1000, some percentage of the incident light 1040 is diffracted as diffracted light 1045, according to the diffraction efficiency of the grating 1000.

FIG. 10B illustrates a grating 1050 with a modified refractive index modulation and increased diffraction efficiency. The grating 1050 includes two substrate layers 1060, 1070 and a polymer layer 1080 which includes regions 1082 and 1084. Each region 1082 is a region of relatively high refractive index (as compared to each region 1084). Each region 1084 is a region of relatively low refractive index (as compared to the first region 1082).

There are several ways to modify the refractive index modulation of the grating 1050 by modifying the refractive index of the polymer layer 1080, in whole or in part. For example, the refractive index modulation of the grating 1050 can be increased by decreasing the refractive index in region 1084 while the refractive index of region 1082 remains substantially constant. The refractive index modulation of the grating 1050 can alternatively be increased by increasing the refractive index in region 1082 while the refractive index of region 1084 remains substantially constant. The refractive index modulation of the grating 1050 can also be increased by decreasing the refractive index in both regions, but decreasing the refractive index more in region 1084. The refractive index modulation of the grating 1050 can be increased by increasing the refractive index in both regions, but increasing the refractive index more in region 1082.

When incident light 1090 passes through the grating 1050, some percentage of the incident light 1090 is diffracted as diffracted light 1095, according to the diffraction efficiency of the grating 1050. As the diffraction efficiency of the grating 1050 in FIG. 10B has been increased, as compared to the diffraction efficiency of grating 1000 of FIG. 10A, a larger fraction of the incident light is diffracted in diffracted light 1095 in comparison to diffracted light 1045.

FIGS. 11A-11C illustrate an example technique for modifying the refractive index modulation in a holographic grating. FIG. 11A illustrates the grating after recording, FIG. 11B illustrates the grating with a substrate replaced by a resin layer that includes nanoparticles (e.g., monomers), and FIG. 11C illustrates the grating after the nanoparticles diffuse into the grating from the resin layer.

FIG. 11A illustrates a recorded holographic grating 1100. The grating 1100 includes a first substrate 1102 disposed on a bottom side of a polymer layer. The polymer layer includes regions of relatively high refractive index 1104 and regions of relatively low refractive index 1106. The polymer layer may, for example, have been exposed to a holographic recording light pattern to record a refractive index modulation pattern in the polymer layer. The grating 1100 further includes a second substrate 1103 disposed on a top side of the polymer layer.

FIG. 11B illustrates a grating 1120 including a resin layer 1123 that includes nanoparticles. Similarly to the grating 1100 of FIG. 11A, the grating 1120 includes a first substrate 1122 disposed on a bottom side of a polymer layer and regions of differing refractive index 1124 and 1126. The second substrate (e.g., second substrate 1103 shown in FIG. 11A) has been removed and replaced with resin layer 1123. The resin layer 1123 includes a support layer or matrix, filled with high refractive index nanoparticles (e.g., with a higher refractive index than the high refractive index region of the polymer layer). The resin layer filled with nanoparticles is also referred to herein as a "monomer reservoir buffer layer." Alternatively, low or moderate refractive index nanoparticles may be used, depending on the modification desired. In some embodiments, the nanoparticles may be monomers. In some embodiments, the nanoparticles may be in the form of a liquid. The resin layer 1123 is disposed on the top side of the polymer layer, such that the resin layer 1123 and the polymer layer are in contact with one another. The sponge layer may be a polymer film, typically an elastomer. Typical elastomers include crosslinked films of polyesters, polyethers, polyurethanes, or polysiloxanes.

When the resin layer 1123 and the polymer layer are placed in contact, the nanoparticles may diffuse from the resin layer 1123 into the polymer layer. As indicated by the gradients in regions 1124, 1126, the introduction of the nanoparticles in the polymer layer modifies the refractive index of regions 1124, 1126.

FIG. 11C illustrates a grating 1140 with modified refractive index modulation. Grating 1140 includes a substrate 1142, a nanoparticle-filled resin layer 1143, and a polymer layer which includes regions of different refractive index 1144, 1146. The nanoparticles have further diffused into the polymer layer, creating a change in the refractive indexes in regions 1144, 1146.

FIGS. 12A-12D illustrate an example of refractive index modulation modification in a holographic grating, according to some embodiments. Depending on the properties of the nanoparticles in the resin layer, the diffusion of the nanoparticles and the resulting refractive index modulation modification may vary. The diffusion properties may be controlled based on the properties of the nanoparticles in the resin layer, such as the refractive index and the solubility in the different regions of the polymer layer. The solubility of the nanoparticles in a given region may be controlled, e.g., based on the size of the nanoparticle and/or the affinity between the nanoparticle and the material in the region of interest.

FIG. 12A illustrates a first example of a grating 1200 with refractive index modulation modification using a monomer (or other nanoparticle) reservoir buffer layer 1202. The grating 1200 includes a polymer layer which includes regions of relatively low refractive index 1204 (with initial refractive index n1) and regions of relatively high refractive index 1206 (with initial refractive index n2). A substrate layer 1201 is disposed on a bottom side of the polymer layer. Monomer reservoir buffer layer 1202 is disposed on a top side of the polymer layer.

In FIG. 12A, the monomer reservoir buffer layer 1202 includes a monomer with a relatively large refractive index n3 (>n2). Further, the monomer is more soluble in low refractive index fringes (e.g., in regions 1204) than in high refractive index fringes (e.g., in regions 1206). Accordingly, the impact on the refractive index modulation is most pronounced with respect to dips in the initial refractive index modulation profile, as indicated in refractive index modulation plot 1208. The plot 1208 shows the refractive index of the grating 1200 as a function of position from left to right across the polymer layer. Initially, before addition of the monomer reservoir buffer layer 1202, the refractive index of the grating 1200 varies between n1 and n2 (as shown by a curve 1209A). With the refractive index modification introduced by the monomer reservoir buffer layer, the refractive index modulation profile changes as shown by a curve 1209B, due to the increase in the refractive index of low refractive index regions 1204 (corresponding to the dips in the refractive index modulation profile).

FIG. 12B illustrates a second example of a grating 1210 with refractive index modulation modification using a monomer reservoir buffer layer 1212. The grating 1210 includes a polymer layer which includes regions of relatively low refractive index 1214 (with refractive index n1) and regions of relatively high refractive index 1216 (with a refractive index n2). A substrate layer 1211 is disposed on a bottom side of the polymer layer. The monomer reservoir buffer layer 1212 is disposed on a top side of the polymer layer.

In FIG. 12B, the monomer reservoir buffer layer 1212 includes a monomer with a relatively large refractive index n3 (>n2). Further, the monomer is more soluble in high refractive index fringes (e.g., in regions 1216) than in low refractive index fringes (e.g., in regions 1214). Accordingly, the impact on the refractive index is most pronounced with respect to peaks in the refractive index modulation profile, as indicated in refractive index modulation plot 1218 (showing an initial refractive index modulation 1219A and a modified refractive index modulation 1219B). In particular, by introducing a larger refractive index material into the regions of relatively high refractive index 1216 via the monomer reservoir buffer layer 1212, the refractive index in the regions of relatively high refractive index 1216 increases. This increase in refractive index causes the peaks in refractive index plot 1219B to increase above the initial level of n2.

FIG. 12C illustrates a third example of a grating 1220 with a refractive index modulation modification using a monomer reservoir buffer layer 1222. Grating 1220 includes a polymer layer which includes regions of relatively low refractive index 1224 (with refractive index n1) and regions of relatively high refractive index 1226 (with refractive index n2). A substrate layer 1221 is disposed on a bottom side of the polymer layer. The monomer reservoir buffer layer 1222 is disposed on a top side of the polymer layer.

In FIG. 12C, the monomer reservoir buffer layer 1222 includes a monomer with a relatively small refractive index n4 (<n1). Further, the monomer is more soluble in low refractive index fringes (e.g., in regions 1224) than in high refractive index fringes (e.g., in regions 1226). Accordingly, the impact on refractive index modulation is most pronounced with respect to dips in the refractive index modulation profile, as indicated in refractive index modulation plot 1228 (showing initial refractive index modulation 1229A and modified refractive index modulation 1229B). By introducing a lower refractive index material into the lower refractive index regions 1224 via the monomer reservoir buffer layer 1222, the refractive index in the regions of relatively low refractive index 1224 decreases, causing refractive index at low points in plot 1229B to dip below n1.

FIG. 12D illustrates a fourth example of a grating 1230 with refractive index modulation modification using a monomer reservoir buffer layer 1232. Grating 1230 includes a polymer layer which includes regions of relatively low refractive index 1234 (with refractive index n1) and regions of relatively high refractive index 1236 (with refractive index n2). A substrate layer 1231 is disposed on a bottom side of the polymer layer. Monomer reservoir buffer layer 1232 is disposed on a top side of the polymer layer.

In FIG. 12D, the monomer reservoir buffer layer 1232 includes a monomer with a relatively small refractive index n4 (<n1). Further, the monomer is more soluble in high refractive index fringes (e.g., in regions 1236) than in low refractive index fringes (e.g., in regions 1234). Accordingly, the impact on the refractive index is most pronounced with respect to the peaks in the refractive index modulation profile, as indicated in refractive index modulation plot 1238 (peaks reduced as-modified 1239B, as compared to initial refractive index modulation 1239A). By introducing a lower refractive index material into the higher refractive index regions 1236 via the monomer reservoir buffer layer 1232, the refractive index in the higher refractive index regions 1236 decreases, causing refractive index at high points in plot 1239B to dip below n2.

FIGS. 13A-13B illustrate variations on refractive index modulation modification in a grating, according to some embodiments. In FIG. 13A, the refractive index modulation modification is substantially constant across the thickness of a region of the polymer layer, while in FIG. 13B, the refractive index modification varies across the thickness of a region of the polymer layer. The "thickness" represents the z-direction from bottom to top of the polymer layer.

FIG. 13A shows a grating 1300 which includes a first region 1302 with an initial refractive index n1 and a second region 1304 with an initial refractive index n2. In the grating 1300, the refractive index modification has occurred through the whole thickness of the polymer layer. Refractive index modulation graphs 1306, 1308 illustrate the refractive index modulation across the polymer layer. Refractive index modulation graph 1306 illustrates the refractive index modulation as a function of position through a cross-section 1305 towards the upper side of the polymer layer. Refractive index modulation graph 1308 illustrates the refractive index modulation as a function of position through a cross-section 1307 towards the lower side of the polymer layer. In the grating 1300, the refractive index modulation modification profile is substantially the same at the cross-sections 1305, 1307. This corresponds to a concentration of nanoparticles (e.g., monomers) being in a substantially constant concentration across the thickness of the polymer layer in a given region. Substantially constant concentration may correspond to some small variations, such as 0.1%, 0.5%, 1%, or 5%.

FIG. 13B shows a grating 1350 which includes a first region 1352 with an initial refractive index n1 and a second region 1354 with an initial refractive index n2. In the grating 1350, the refractive index modulation modification has occurred in a portion of the polymer layer. Refractive index modulation graphs 1356, 1358 illustrate the refractive index modulation across the polymer layer. Refractive index modulation graph 1356 illustrates the refractive index modulation as a function of position through a cross-section 1355 towards the upper side of the polymer layer. Refractive index modulation graph 1358 illustrates the refractive index modulation as a function of position through a cross-section 1357 towards the lower side of the polymer layer. In the grating 1350, the refractive index modulation at cross-section 1355 has been modified. Monomers of refractive index n3, which is greater than n1, have diffused preferentially into region 1352 near a top surface of the polymer layer, which causes the refractive index in region 1352 to shift upward from n1 in plot 1356. In contrast, at cross-section 1357, the monomers have not diffused to this point of the polymer layer, so the refractive index modulation has not been modified as shown in graph 1358). The refractive index modulation modification shown in FIG. 13B corresponds to the monomers or other nanoparticles being more highly concentrated in proximity to the upper edge of the polymer layer (e.g., the top surface of the polymer layer shown in FIG. 13B).

Accordingly, based on the position and contents of the monomer reservoir buffer layer(s), the refractive index modulation modification can be customized to taper as a function of the thickness within the polymer layer. The refractive index modulation modification may happen only across a certain diffusion depth. The refractive index modulation may be tapered to smooth the refractive index modulation from the upper and/or lower edges of the polymer layer towards the center of the polymer layer. This tapered refractive index modulation can be used to reduce sidelobes of the diffracted order and improve performance of the waveguide display.

Figure 14:
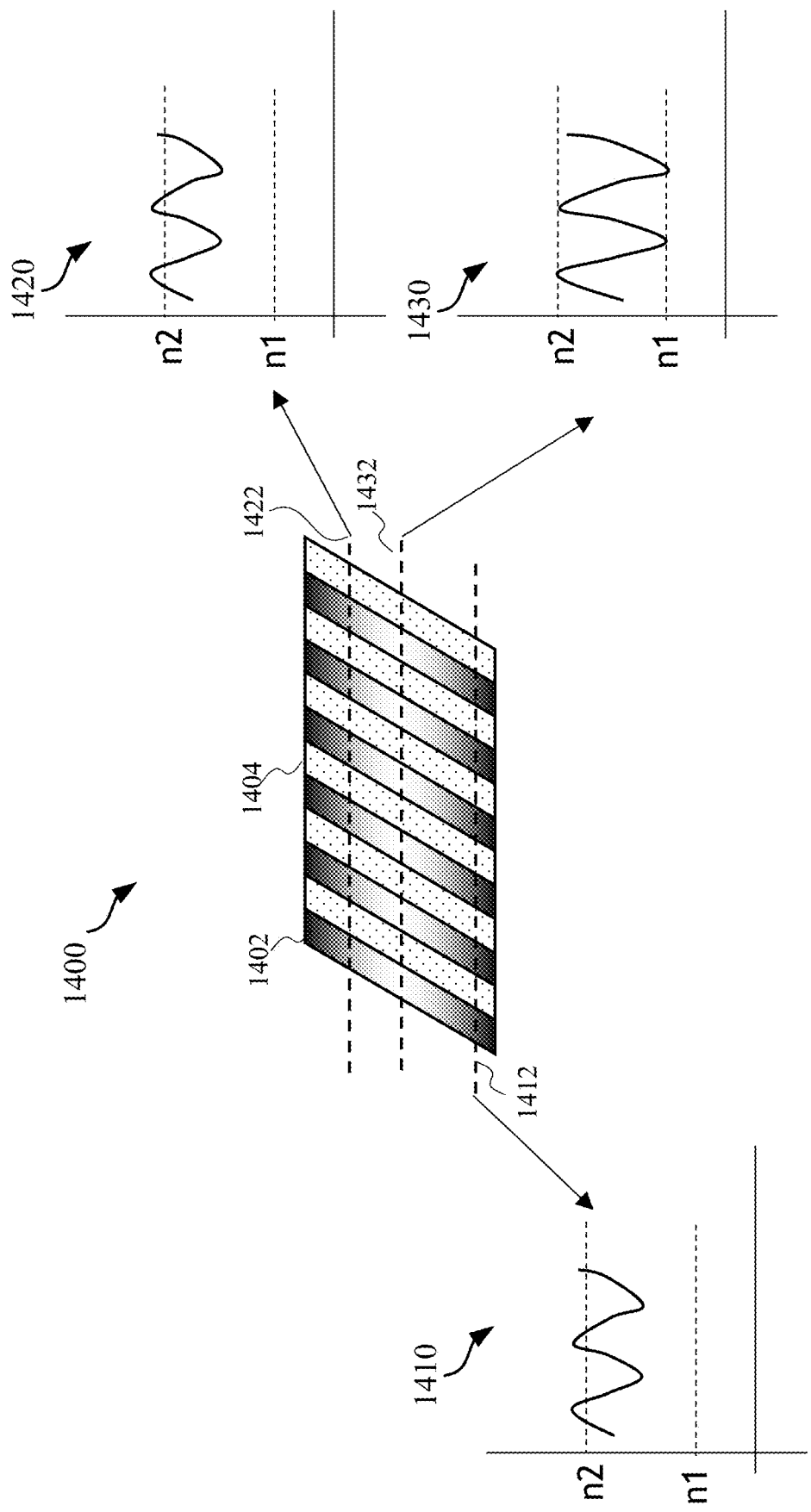
FIG. 14 illustrates a grating with tapered refractive index modification.

FIG. 14 illustrates a grating 1400 with a refractive index modulation profile that is tapered on both a top and a bottom edge of the grating. Region 1402 has an initial refractive index of n1 and region 1402 has an initial refractive index of n2. The refractive index across the grating has been modulated (e.g., by affixing monomer reservoir buffer layers to the upper and lower edges of the polymer layer). The modulation affects the grating most strongly at the top and the bottom, where the monomer is more concentrated in proximity to the upper and lower edges of the polymer layer. Graph 1430 shows the refractive index modulation across the grating at cross-section 1432 at the center of the grating 1400 in terms of thickness. The refractive index modulation modification from the monomer reservoir buffer layers does not reach to the center. Accordingly, at cross-section 1432 the refractive index modulation remains at an initial level.

Graph 1410 shows the refractive index modulation across the grating at cross-section 1412 near the bottom of the grating 1400. The refractive index modulation modification from the monomer reservoir buffer layer at the bottom of the grating has reached the depth level indicated by cross-section 1412. Accordingly, at cross-section 1412 the refractive index modulation has been modified such that the refractive index in regions 1402 is increased, as indicated in graph 1410. In comparison with graph 1430, in graph 1410, the lowest points in refractive index have shifted upwards from n1.

Graph 1420 shows the refractive index modulation across the grating at cross-section 1422 near the top of the grating 1400. The refractive index modulation modification from the monomer reservoir buffer layer at the top of the grating has reached the depth level indicated by cross-section 1422. Accordingly, at cross-section 1422 the refractive index modulation has been modified such that the refractive index in regions 1402 is increased, as indicated in graph 1420. In comparison with graph 1430, in graph 1420, the lowest points in refractive index have shifted upwards from n1.

Figure 15A:
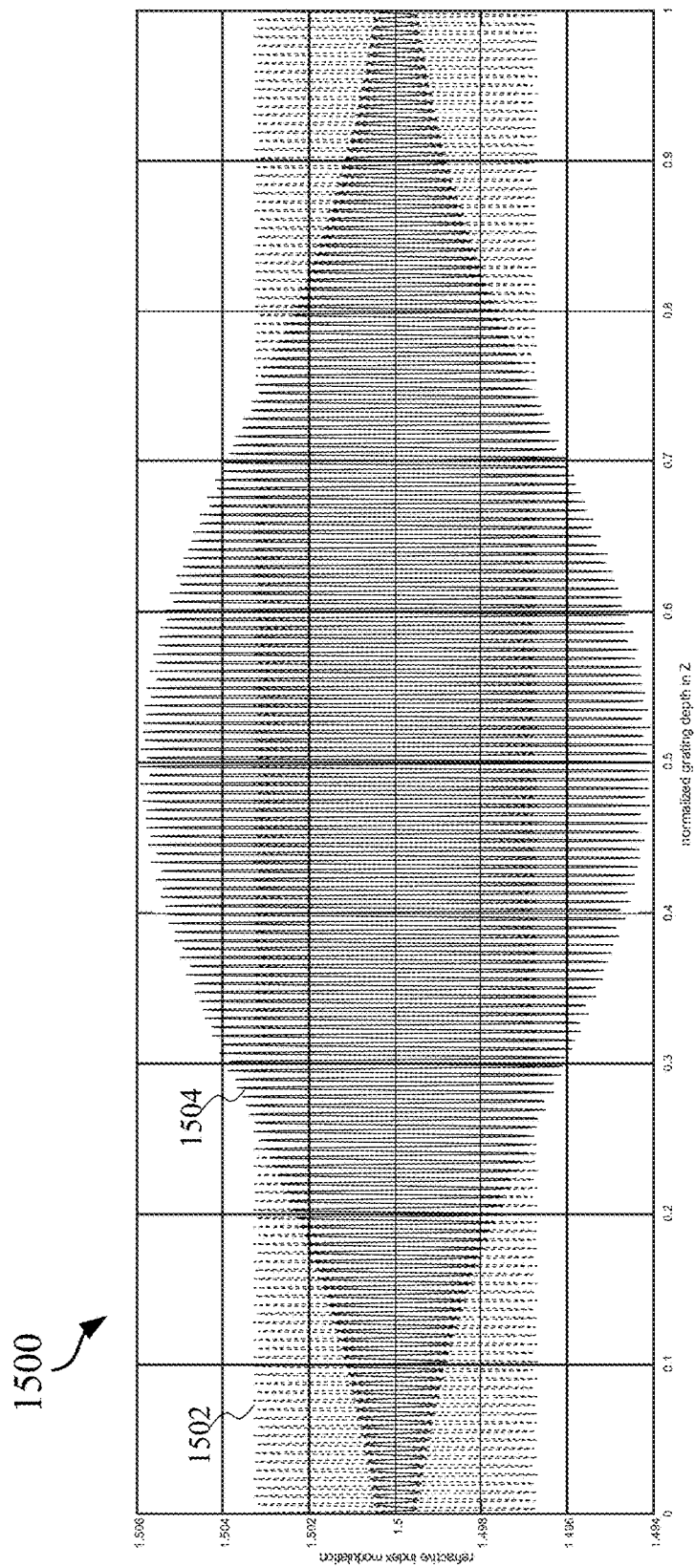
FIGS. 15A-15B illustrate an example of a refractive index modulation profile in an apodized grating.
Figure 15B:
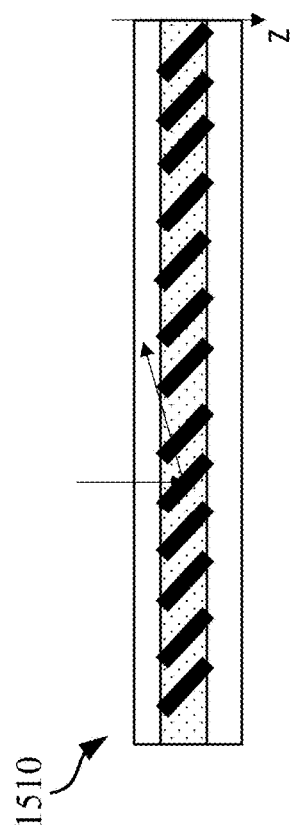

FIGS. 15A-15B illustrate an example of refractive index modulation in an apodized grating in accordance with some embodiments. FIG. 15A shows the refractive index modulation as a function of grating depth z (as illustrated in FIG. 15B), with and without refractive index modification.

In FIG. 15A, a refractive index modulation profile in an apodized grating is shown. This apodized grating may be used in a 1-D or 2-D pupil expander in a waveguide-based near-eye display system, as shown in FIG. 15B. Refractive index modulation without index profile modulation 1502 has a constant profile with respect to normalized grating depth z. A refractive index modulation with index profile modulation 1504 can be used to reduce or eliminate sidelobes, as illustrated in FIGS. 16A-16B.

Figure 16B:
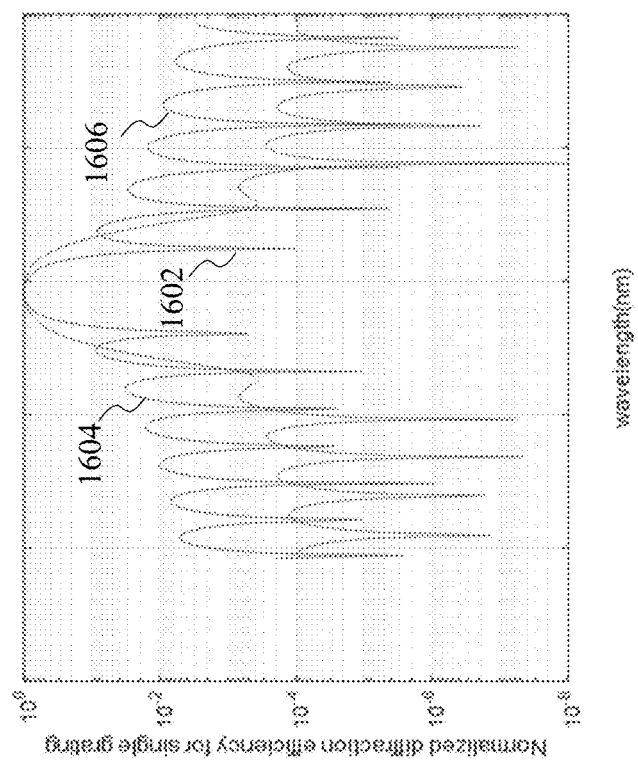
FIGS. 16A-16B illustrate sidelobe reduction using an apodized grating in accordance with some embodiments.
Figure 16A:
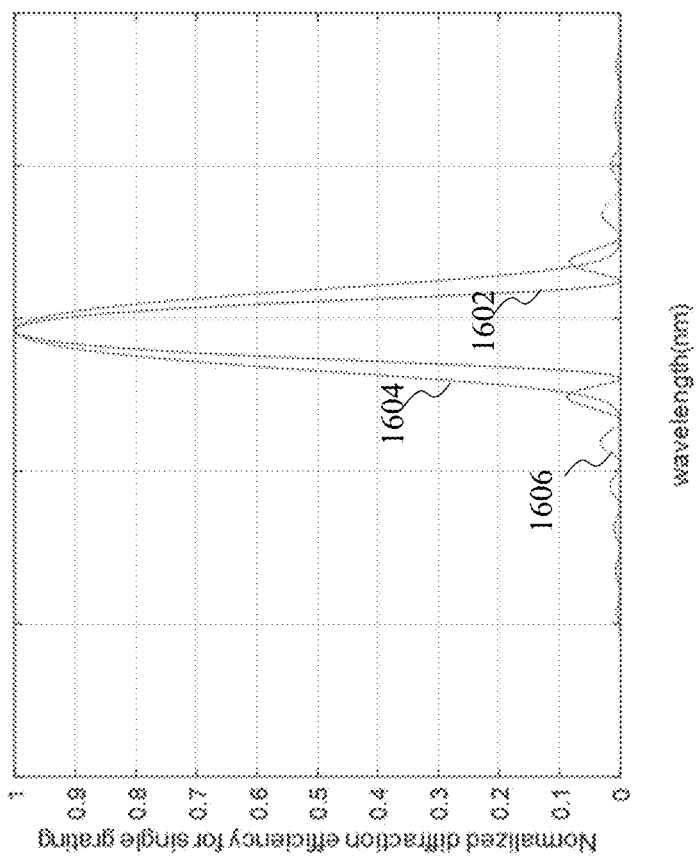

FIGS. 16A-16B illustrate sidelobe reduction using an apodized grating in accordance with some embodiments. In FIG. 16A, normalized diffraction efficiency for a single grating is shown as a function of wavelength. Plot 1602 may correspond to a grating without apodization. Sidelobes 1606 are visible. These sidelobes are undesirable, particularly in multiplexed gratings. In multiplexed gratings, the sidelobes in diffraction pattern cause crosstalk, reducing the image contrast. To avoid such crosstalk, the number of gratings multiplexed may be limited, which limits the efficiency achievable.

Plot 1604, on the other hand, corresponds to a grating with variable refractive index across the thickness of the grating, reducing the sidelobes. To reduce the sidelobes, the refractive index of the grating should be modified so that the refractive index modulation is higher at the center of the grating and lower at one or more sides of the grating, as illustrated in FIGS. 13B and 14. In some embodiments, a bell-shaped refractive index modulation profile across the z-direction in the grating may be generated, as illustrated in FIGS. 15A-15B. Accordingly, varying the refractive index across the thickness of the grating can reduce sidelobes and crosstalk in multiplexed gratings. This improves the image contrast and enables a larger number of gratings to be multiplexed, increasing the overall efficiency.

In FIG. 16B, the normalized diffraction efficiency vs wavelength plots 1602 and 1604 are shown on a logarithmic scale, further highlighting the sidelobes 1606 and reduction thereof.

Figure 17:
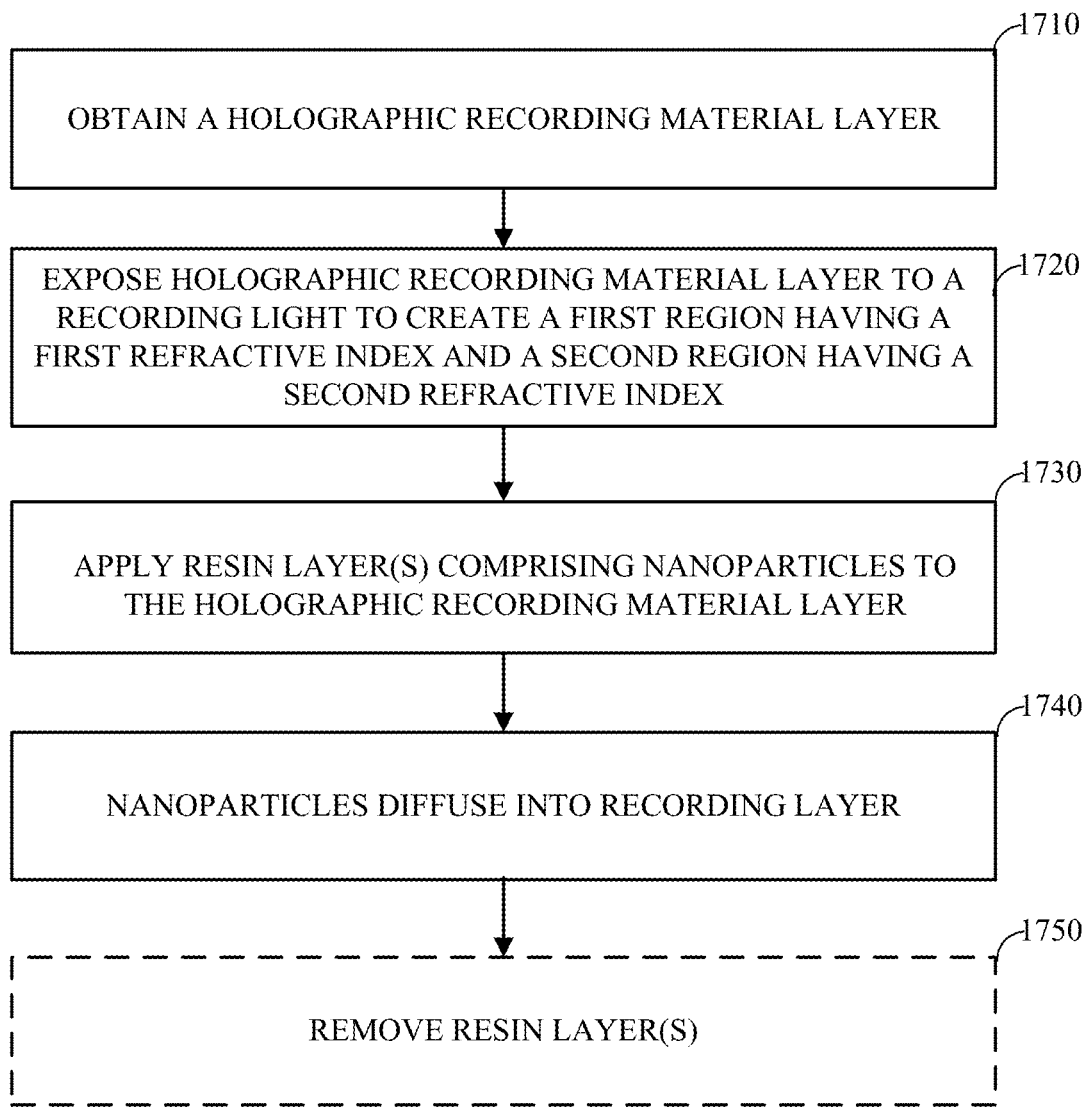
FIG. 17 is a simplified flow chart illustrating an example of a method of fabricating a holographic optical element according to certain embodiments.

FIG. 17 is a simplified flow chart 1700 illustrating an example of a method of fabricating a holographic optical element according to certain embodiments. The operations described in flow chart 1700 are for illustration purposes only and are not intended to be limiting. In various implementations, modifications may be made to flow chart 1700 to add additional operations, omit some operations, combine some operations, split some operations, or reorder some operations.

At block 1710, a holographic recording material layer may be obtained. The holographic recording material layer may include a mixture of matrix monomers and writing monomers. The matrix monomers may be configured to polymerize (e.g., via thermal treatment) to form a polymer matrix. The writing monomers may be dispersed in the matrix monomers and may be configured to polymerize when the holographic recording material is exposure to recording light. The matrix monomers may have different refractive index(es) from the writing monomers. For example, the writing monomers may have a higher refractive index than the matrix monomers.

In some embodiments, the layer of the holographic recording material may be cured, for example, thermally or optically, to polymerize the matrix monomers and form a polymer matrix. The writing monomers may not polymerize under the curing condition and may be dispersed in the formed polymer matrix. The polymer matrix may function as a support matrix or backbone of the layer of the holographic recording material.

At block 1720, the layer of holographic recording material may be exposed to a recording light pattern to polymerize the writing monomers in selected regions, such as the bright fringes of the recording light pattern, as described above with respect to, for example, FIGS. 7A-8. The recording light pattern may correspond to a grating, a lens, a diffuser, and the like. The recording light pattern may cause the polymerization and diffusion of the writing monomers to form a holographic optical element corresponding to the recording light pattern. The exposure to the recording light pattern creates a first region having a first refractive index and a second region having a second refractive index.

At block 1730, a resin layer comprising nanoparticles may be applied to the holographic recording material layer. For example, the layer of the holographic recording material may be deposited or laminated on a first resin layer. In some embodiments, the holographic recording material layer may be laminated on a substrate, which is removed before applying the resin layer. In some embodiments, the holographic recording material layer may be sandwiched between two resin layers. Alternatively, the holographic recording material layer may be laminated on a substrate (e.g., glass or plastic) layer on one side, and a resin layer is applied to the holographic recording material layer on the other side. Application of the resin layer causes diffusion of nanoparticles from the resin layer into the holographic recording material layer. Particles will further diffuse from the holographic recording material layer into the resin layer. If unreacted monomer from the initial holographic film is not present in the resin layer, the monomer will diffuse from the holographic film to the resin layer just because there is a natural concentration gradient between the two films. Accordingly, the refractive index in the holographic recording material layer is modified due to the diffusion of particles. The concentration of nanoparticles in the resin layer may be controlled so that, after a time, no nanoparticles are available to diffuse into the holographic recording material layer. Alternatively, or additionally, the removal of the resin layer may be timed to tailor the nanoparticle concentration in the holographic recording material layer. The concentration of the nanoparticles may be tailored to achieve any of the configurations for increasing the diffractive efficiency or apodizing the grating described above.

Optionally, at block 1740, the resin layer(s) may be removed from the layer of the holographic recording material. The holographic recording material layer may then be laminated on one or more substrates. For example, the resin layer may comprise a flexible polyester film or plastic sheeting. Such a flexible resin layer may be peeled off of the holographic recording material layer. The layer of the holographic recording material on one substrate may then be laminated on a substrate, such as an optical component (e.g., a quartz, glass, crystal plate, or lens).

Removal of the resin layer and/or a substrate without damaging the holographic recording material layer can be achieved in multiple ways. The use of a pliable material such as flexible plastic may facilitate low impact layer removal. Alternatively, or additionally, a resin layer or substrate may be treated with an anti-adhesion component to make the layer remove easily.

Figure 18:
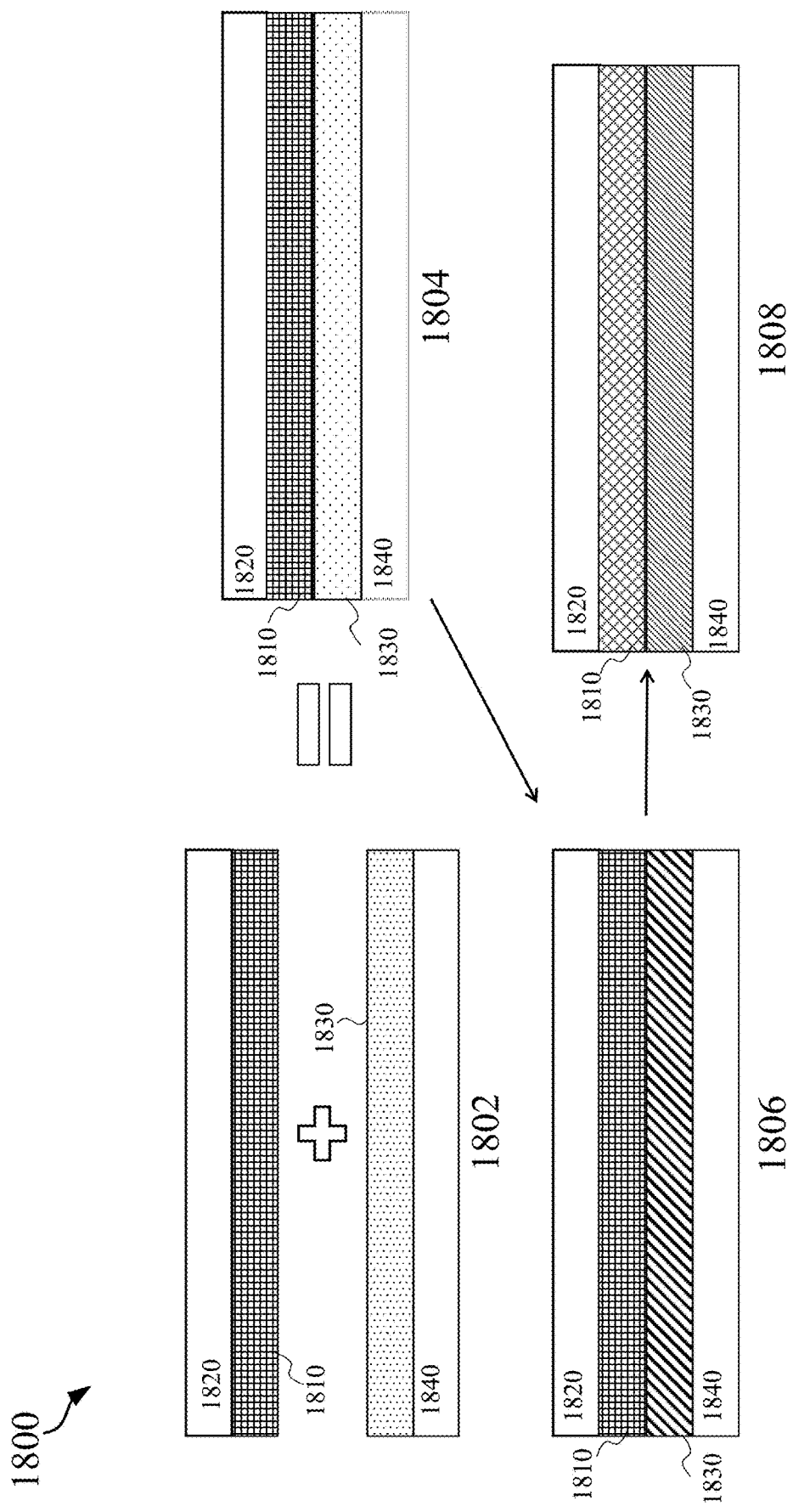
FIG. 18 is a schematic diagram showing another holographic optical element fabrication method according to some embodiments.

FIG. 18 is a schematic diagram showing another HOE fabrication method 1800, according to some embodiments. HOE fabrication method 1800 is similar to the method described above with respect to FIG. 7, but the resin layer(s) are applied before holographic exposure.

At 1802, a resin layer 1810, filled with nanoparticles such as monomers with some predetermined refractive index, is applied to a first substrate 1820. The resin layer 1810 may be bonded to, or deposited on, the first substrate 1820. A holographic recording material layer 1830 is applied to a second substrate 1840. Similarly, the holographic recording material layer 1830 may be bonded to, or deposited on, the second substrate 1840. In some embodiments, the resin layer and the holographic recording material layer have similar properties. For example the resin layer and the holographic recording material layer may both comprise a polymer matrix. However, the holographic recording material layer may differ in the addition of photoinitiators for holographic recording.

At 1804, resin layer 1810 and first substrate 1820 are disposed on the holographic recording material layer 1830 and second substrate 1840. The resin layer 1810 is placed in contact with the holographic recording material layer 1830. The resin layer 1810 is laminated or bonded to the holographic recording material layer 1830. Nanoparticles may diffuse from the resin layer 1810 to the holographic recording material layer 1830. Species may also diffuse into the resin layer 1810 from the holographic recording material layer 1830. The dispersion of the nanoparticles may be tailored to achieve any of the configurations for increasing the diffractive efficiency or apodizing the grating described above.

At 1806, a hologram is recorded in the holographic recording material layer 1830. A recoding light pattern is applied to at least the recording material layer, as described above with respect to FIG. 17.

At 1808, the hologram has been recorded in holographic recording material layer 1830. The resin layer 1810 may remain affixed to the holographic recording material layer 1830. Diffusion may continue for a time after the hologram is recorded. As nanoparticles diffuse from the resin layer 1810 into the holographic recording material layer 1830, or vice versa, the refractive index modulation may continue to change. The amount of diffusion, and the corresponding refractive index change, may be controlled by controlling the amount of nanoparticles in the resin layer 1810 (e.g., so that only a desired amount of nanoparticles are available). The speed of the diffusion process (and the solubility of the monomer in the grating) can be controlled by increasing/decreasing the temperature. In addition, the diffusion process could be stopped by flood exposing both films to polymerize the diffused monomer. Further, the support layer of the resin layer may be selected so as to be transparent to visible light (e.g., similar to a substrate layer), to avoid affecting performance of the holographic optical element.

Embodiments may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 19:
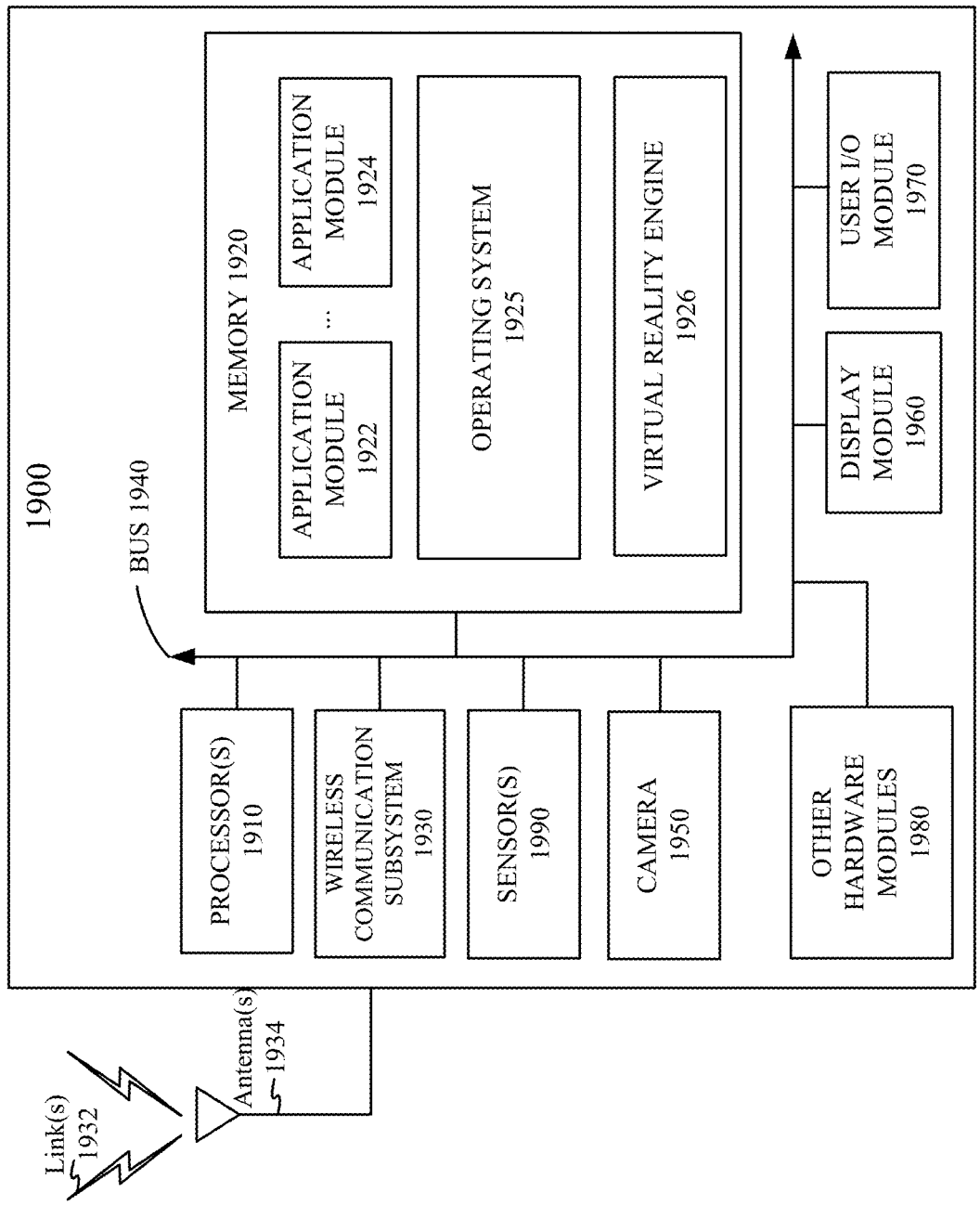
FIG. 19 is a simplified block diagram of an example of an electronic system of a near-eye display system (e.g., HMD device) for implementing some of the examples disclosed herein according to certain embodiments.

FIG. 19 is a simplified block diagram of an example of an electronic system 1900 of a near-eye display system (e.g., HMD device) for implementing some of the examples disclosed herein. Electronic system 1900 may be used as the electronic system of an HMD device or other near-eye displays described above. In this example, electronic system 1900 may include one or more processor(s) 1910 and a memory 1920. Processor(s) 1910 may be configured to execute instructions for performing operations at a number of components, and can be, for example, a general-purpose processor or microprocessor suitable for implementation within a portable electronic device. Processor(s) 1910 may be communicatively coupled with a plurality of components within electronic system 1900. To realize this communicative coupling, processor(s) 1910 may communicate with the other illustrated components across a bus 1940. Bus 1940 may be any subsystem adapted to transfer data within electronic system 1900. Bus 1940 may include a plurality of computer buses and additional circuitry to transfer data.

Memory 1920 may be coupled to processor(s) 1910. In some embodiments, memory 1920 may offer both short-term and long-term storage and may be divided into several units. Memory 1920 may be volatile, such as static random access memory (SRAM) and/or dynamic random access memory (DRAM) and/or non-volatile, such as read-only memory (ROM), flash memory, and the like. Furthermore, memory 1920 may include removable storage devices, such as secure digital (SD) cards. Memory 1920 may provide storage of computer-readable instructions, data structures, program modules, and other data for electronic system 1900. In some embodiments, memory 1920 may be distributed into different hardware modules. A set of instructions and/or code might be stored on memory 1920. The instructions might take the form of executable code that may be executable by electronic system 1900, and/or might take the form of source and/or installable code, which, upon compilation and/or installation on electronic system 1900 (e.g., using any of a variety of generally available compilers, installation programs, compression/decompression utilities, etc.), may take the form of executable code.

In some embodiments, memory 1920 may store a plurality of application modules 1922 through 1924, which may include any number of applications. Examples of applications may include gaming applications, conferencing applications, video playback applications, or other suitable applications. The applications may include a depth sensing function or eye tracking function. Application modules 1922-1924 may include particular instructions to be executed by processor(s) 1910. In some embodiments, certain applications or parts of application modules 1922-1924 may be executable by other hardware modules 1980. In certain embodiments, memory 1920 may additionally include secure memory, which may include additional security controls to prevent copying or other unauthorized access to secure information.

In some embodiments, memory 1920 may include an operating system 1925 loaded therein. Operating system 1925 may be operable to initiate the execution of the instructions provided by application modules 1922-1924 and/or manage other hardware modules 1980 as well as interfaces with a wireless communication subsystem 1930 which may include one or more wireless transceivers. Operating system 1925 may be adapted to perform other operations across the components of electronic system 1900 including threading, resource management, data storage control and other similar functionality.

Wireless communication subsystem 1930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1900 may include one or more antennas 1934 for wireless communication as part of wireless communication subsystem 1930 or as a separate component coupled to any portion of the system. Depending on desired functionality, wireless communication subsystem 1930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1930 may permit data to be exchanged with a network, other computer systems, and/or any other devices described herein. Wireless communication subsystem 1930 may include a means for transmitting or receiving data, such as identifiers of HMD devices, position data, a geographic map, a heat map, photos, or videos, using antenna(s) 1934 and wireless link(s) 1932. Wireless communication subsystem 1930, processor(s) 1910, and memory 1920 may together comprise at least a part of one or more of a means for performing some functions disclosed herein.

Embodiments of electronic system 1900 may also include one or more sensors 1990. Sensor(s) 1990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1990 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1900 may include a display module 1960. Display module 1960 may be a near-eye display, and may graphically present information, such as images, videos, and various instructions, from electronic system 1900 to a user. Such information may be derived from one or more application modules 1922-1924, virtual reality engine 1926, one or more other hardware modules 1980, a combination thereof, or any other suitable means for resolving graphical content for the user (e.g., by operating system 1925). Display module 1960 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1900 may include a user input/output module 1970. User input/output module 1970 may allow a user to send action requests to electronic system 1900. An action request may be a request to perform a particular action. For example, an action request may be to start or end an application or to perform a particular action within the application. User input/output module 1970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1900. In some embodiments, user input/output module 1970 may provide haptic feedback to the user in accordance with instructions received from electronic system 1900. For example, the haptic feedback may be provided when an action request is received or has been performed.

Electronic system 1900 may include a camera 1950 that may be used to take photos or videos of a user, for example, for tracking the user's eye position. Camera 1950 may also be used to take photos or videos of the environment, for example, for VR, AR, or MR applications. Camera 1950 may include, for example, a complementary metal-oxide-semiconductor (CMOS) image sensor with a few millions or tens of millions of pixels. In some implementations, camera 1950 may include two or more cameras that may be used to capture 3-D images.

In some embodiments, electronic system 1900 may include a plurality of other hardware modules 1980. Each of other hardware modules 1980 may be a physical module within electronic system 1900. While each of other hardware modules 1980 may be permanently configured as a structure, some of other hardware modules 1980 may be temporarily configured to perform specific functions or temporarily activated. Examples of other hardware modules 1980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1980 may be implemented in software.

In some embodiments, memory 1920 of electronic system 1900 may also store a virtual reality engine 1926. Virtual reality engine 1926 may execute applications within electronic system 1900 and receive position information, acceleration information, velocity information, predicted future positions, or some combination thereof of the HMD device from the various sensors. In some embodiments, the information received by virtual reality engine 1926 may be used for producing a signal (e.g., display instructions) to display module 1960. For example, if the received information indicates that the user has looked to the left, virtual reality engine 1926 may generate content for the HMD device that mirrors the user's movement in a virtual environment. Additionally, virtual reality engine 1926 may perform an action within an application in response to an action request received from user input/output module 1970 and provide feedback to the user. The provided feedback may be visual, audible, or haptic feedback. In some implementations, processor(s) 1910 may include one or more GPUs that may execute virtual reality engine 1926.

In various implementations, the above-described hardware and modules may be implemented on a single device or on multiple devices that can communicate with one another using wired or wireless connections. For example, in some implementations, some components or modules, such as GPUs, virtual reality engine 1926, and applications (e.g., tracking application), may be implemented on a console separate from the head-mounted display device. In some implementations, one console may be connected to or support more than one HMD.

In alternative configurations, different and/or additional components may be included in electronic system 1900. Similarly, functionality of one or more of the components can be distributed among the components in a manner different from the manner described above. For example, in some embodiments, electronic system 1900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A holographic grating comprising:
  a polymer layer comprising:
    a first region characterized by a first refractive index;
    a second region characterized by a second refractive index, the second refractive index being higher than the first refractive index; and
    a plurality of nanoparticles dispersed in the polymer layer, the nanoparticles having a higher concentration in either the first region or the second region, wherein the nanoparticles include monomers.

2. The holographic grating of claim 1, wherein:
  the nanoparticles have the higher concentration in the second region; and
  the nanoparticles have a third refractive index that is higher than the second refractive index.

3. The holographic grating of claim 1, wherein:
  the nanoparticles have the higher concentration in the first region; and
  the nanoparticles have a third refractive index that is lower than the first refractive index.

4. The holographic grating of claim 1, wherein the nanoparticles in the first region or the second region have a substantially constant concentration with respect to a thickness of the polymer layer.

5. The holographic grating of claim 1, wherein the polymer layer comprises a multiplexed volume Bragg grating.

6. A grating comprising:
  a polymer layer comprising:
    a first region characterized by a first refractive index;
    a second region characterized by a second refractive index, the second refractive index being higher than the first refractive index; and
    a plurality of nanoparticles dispersed in the polymer layer, the nanoparticles having a higher concentration in proximity to a surface of the polymer layer in one or more of the first region or the second region, such that a refractive index modulation of the grating is apodized.

7. The grating of claim 6, wherein the nanoparticles are monomers.

8. The grating of claim 6, wherein:
  the nanoparticles have the higher concentration in the first region; and
  the nanoparticles have a third refractive index that is higher than the first refractive index.

9. The grating of claim 6, wherein:
  the nanoparticles have the higher concentration in the second region; and
  the nanoparticles have a third refractive index that is lower than the second refractive index.

10. The grating of claim 6, wherein the polymer layer comprises a multiplexed volume Bragg grating.

11. A holographic grating comprising:
  a polymer layer comprising:
    a first region characterized by a first refractive index;
    a second region characterized by a second refractive index, the second refractive index being higher than the first refractive index; and
    a plurality of nanoparticles dispersed in the polymer layer,
  wherein:
    the nanoparticles have a higher concentration in the second region and the nanoparticles have a third refractive index that is higher than the second refractive index; or
    the nanoparticles have a higher concentration in the first region and the nanoparticles have a fourth refractive index that is lower than the first refractive index.

12. The holographic grating of claim 11, wherein the nanoparticles in the first region or the second region have a substantially constant concentration with respect to a thickness of the polymer layer.

13. The holographic grating of claim 11, wherein the nanoparticles have a higher concentration in proximity to a surface of the polymer layer in one or more of the first region or the second region, such that a refractive index modulation of the holographic grating is apodized.

14. The holographic grating of claim 11, wherein the nanoparticles comprise monomers.

15. The holographic grating of claim 11, wherein the polymer layer comprises a multiplexed volume Bragg grating.

* * * * *